United States Patent
Yoshimura et al.

(10) Patent No.: US 10,477,456 B2
(45) Date of Patent: Nov. 12, 2019

(54) TERMINAL APPARATUS AND BASE STATION APPARATUS

(71) Applicant: Sharp Kabushiki Kaisha, Sakai, Osaka (JP)

(72) Inventors: Tomoki Yoshimura, Sakai (JP); Hiromichi Tomeba, Sakai (JP); Takashi Onodera, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/545,801

(22) PCT Filed: Jan. 4, 2016

(86) PCT No.: PCT/JP2016/050041
§ 371 (c)(1),
(2) Date: Jul. 24, 2017

(87) PCT Pub. No.: WO2016/121409
PCT Pub. Date: Aug. 4, 2016

(65) Prior Publication Data
US 2018/0020396 A1 Jan. 18, 2018

(30) Foreign Application Priority Data
Jan. 26, 2015 (JP) .................................. 2015-012831

(51) Int. Cl.
*H04W 48/12* (2009.01)
*H04W 72/04* (2009.01)
(Continued)

(52) U.S. Cl.
CPC ........... *H04W 48/12* (2013.01); *H04W 72/04* (2013.01); *H04W 72/042* (2013.01);
(Continued)

(58) Field of Classification Search
CPC ..... H04W 72/04; H04W 74/08; H04W 84/12; H04W 48/12; H04W 74/0816; H04W 72/042

See application file for complete search history.

(56) References Cited

U.S. PATENT DOCUMENTS 9,204,451 B2   12/2015   Porat
9,867,214 B2   1/2018    Porat
(Continued)

FOREIGN PATENT DOCUMENTS

EP    2775776 A1      9/2014
WO    2014/071308 A1  5/2014

OTHER PUBLICATIONS

Graham Smith; Dynamic Sensitivity Control Practical Usage; IEEE 802.11-1410779r2; Jul. 2014.
(Continued)

*Primary Examiner* — Kyaw Z Soe
(74) *Attorney, Agent, or Firm* — ScienBiziP, P.C.

(57) ABSTRACT

An object of the present invention is to protect the communication of a legacy terminal while achieving favorable communication rendering the CCA level of a CCA-variable terminal apparatus variable in an environment, premised on CSMA/CA, where the CCA-variable terminal apparatus and a legacy terminal apparatus coexist. A terminal apparatus for performing wireless communication with a base station apparatus includes: a receiving unit that receives a radio signal transmitted from the base station apparatus; a CCA-variable channel information processing unit that acquires first CCA-variable channel instruction information contained in the radio signal and containing information regarding a range of a CCA level that is available on a certain channel and that is used for clear channel assessment; and a higher layer unit that selects, according to the first CCA-variable channel instruction information, a channel to be used.

8 Claims, 11 Drawing Sheets

(51) Int. Cl.
*H04W 74/08* (2009.01)
*H04W 84/12* (2009.01)
*H04W 52/18* (2009.01)

(52) U.S. Cl.
CPC ....... *H04W 74/08* (2013.01); *H04W 74/0816* (2013.01); *H04W 84/12* (2013.01); *H04W 52/18* (2013.01)

(56) References Cited

U.S. PATENT DOCUMENTS

| | | | | |
|---|---|---|---|---|
| 2007/0286122 | A1* | 12/2007 | Fonseca | H04L 1/0021 370/329 |
| 2013/0223250 | A1* | 8/2013 | Matsuo | H04W 74/0808 370/252 |
| 2014/0198741 | A1* | 7/2014 | Barriac | H04W 74/006 370/329 |
| 2014/0254510 | A1* | 9/2014 | Porat | H04W 72/0493 370/329 |
| 2015/0319700 | A1 | 11/2015 | Oteri et al. | |
| 2016/0081118 | A1 | 3/2016 | Porat | |
| 2017/0055292 | A1* | 2/2017 | Sato | H04W 72/08 |
| 2018/0115993 | A1 | 4/2018 | Porat | |

OTHER PUBLICATIONS

James,Wang et al., Increased Network Throughput with Channel Width Related CCA and Rules, IEEE 802.11-14/0880r1, IEEE mentor, Jul. 15, 2014.

\* cited by examiner

TERMINAL APPARATUS AND BASE STATION APPARATUS

TECHNICAL FIELD

The present invention relates to a technology for a terminal apparatus and a base station apparatus that are applied to a communication system that controls transmission opportunities through carrier sense.

BACKGROUND ART

Recently, IEEE 802.11ac, which achieves a further increase in speed of the wireless LAN (local area network) standards IEEE 802.11, has been formulated by the IEEE (Institute of Electrical and Electronics Engineers Inc.). Currently, activities for the standardization of IEEE 802.11ax, which is a successor to IEEE 802.11ac, are being initiated. Along with the rapid spread of wireless LAN devices, studies regarding an increase in throughput per user in an environment where wireless LAN devices are densely arranged have also been. conducted in the standardization of IEEE 802.11ax.

A wireless LAN system is a system that determines, according to carrier sense (CS), whether a transmission is allowed or disallowed. If a reception interference level is lower than a threshold according to carrier sense, it is determined that a transmission is allowed, and if interference power that is higher than the threshold is received, a transmission is avoided.

In the standardization of IEEE 802.11ax, discussions have taken place over change or dynamic control of the carrier sense threshold value. In an environment where wireless LAN devices are densely arranged, increases in transmission opportunities for each device are expected to be brought about by raising the carrier sense threshold value. However, raising the carrier sense threshold value raises concern about an increase in interference level on the receiving side.

In NPL 1 interference control is exercised by dynamically changing a threshold value for carrier sense (carrier sense level, CCA level: clear channel assessment level). An example is a mechanism in which terminal apparatuses placed at a short distance from each other can have their transmission opportunities increased raising the CCA level. Raising the CCA level is assumed to cause an increase in the amount of interference that other terminal apparatuses suffer. However, the influence of interference can be reduced by the use of the beam forming of the transmitting terminal apparatus, MU-MIMO (multi-user multiple input multiple output, SDMA: spatial division multiple access), or a technology for interference suppression of the receiving terminal apparatus.

In the standardization of IEEE 802.11ax, discussions have taken place over a function of rendering the CCA level variable. For that reason, an IEEE 802.11ax-compliant terminal apparatus (ax terminal) is assumed to use a value that is different from the conventional CCA level.

CITATION LIST

Non Patent Literature

NPL 1: IEEE 802.11-14/0779r2 DSC Practical Usage

SUMMARY OF INVENTION

Technical Problem

However, while it is considered that the function of rendering the CCA level variable makes it possible for a terminal apparatus that is compatible with the function of rendering the CCA level variable (such a terminal apparatus being hereinafter referred to as "CCA-variable terminal apparatus") to perform favorable communication thanks to the effect of interference control, there is concern that an increase in the amount of interference leads to substantially reduced transmission opportunities for a terminal apparatus that is not compatible with the function of rendering the CCA level variable (e.g. a terminal apparatus that is compliant with IEEE 802.11a, IEEE 802.11b, IEEE 802.11g, IEEE 802.11n, IEEE 802.11ac, or the like, which is a predecessor to IEEE 802.11ax; such a terminal apparatus being hereinafter also referred to as "legacy terminal apparatus").

The present invention has been made in view of such circumstances, and has as an object to provide a terminal apparatus and a base station apparatus that make it possible to protect the communication of a legacy terminal while achieving favorable communication by rendering the CCA level of a CCA-variable terminal apparatus variable in an environment, premised on CSMA/CA, where the CCA-variable terminal apparatus and a legacy terminal apparatus coexist.

Solution to Problem

In order to attain the foregoing object, the present invention has taken the following measures terminal apparatus according to the present invention is a terminal apparatus that is applied to a communication system which controls transmission opportunities through carrier sense and that performs wireless communication with a base station apparatus, including: a CCA-variable channel information processing unit that, according to first CCA (clear channel assessment) variable channel instruction information acquired from the base station apparatus, gives an instruction to switch to another channel; and a CSMA/CA unit that selects, according to the instruction, selects a channel on which to perform carrier sense.

In this way, the instruction to switch to another channel is given according to the first CCA-variable channel instruction information acquired from the base station apparatus. For example, an instruction to switch to a channel whose CCA level can be changed. Moreover, the channel on which to perform carrier sense is selected according to the instruction. This allows each terminal apparatus to use separate radio resources, whereby the occurrence of decreases in communication opportunities for terminal apparatuses is avoided. This makes it possible to significantly increase throughput per terminal apparatus.

Advantageous Effects of Invention

The present invention makes it possible to significantly increase throughput per terminal apparatus while achieving favorable communication.

BRIEF DESCRIPTION OF DRAWINGS

FIG. 6 is a diagram showing an apparatus configuration of a terminal apparatus 200a.

DESCRIPTION OF EMBODIMENTS

Figure 1:
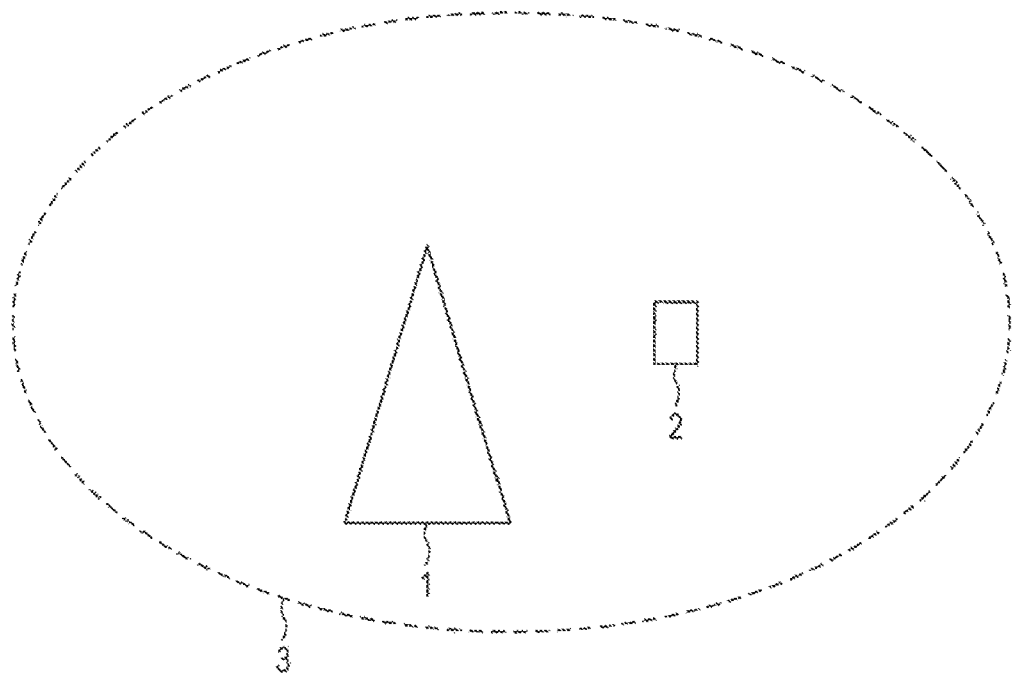
FIG. 1 is a diagram showing an example of a wireless LAN system configuration.

A communication system according to the present embodiment includes a radio transmitting apparatus (AP: access point, base station apparatus) and a plurality of radio receiving apparatuses (STAs: stations, terminal apparatuses). Further, the AP and the STAs constitute a network that is referred to as "basic service set (BSS, range of management)". Further, the radio transmitting apparatus and the radio receiving apparatuses are also collectively referred to as "wireless LAN (local area network) apparatuses".

It is assumed that the AP and the STAs in the BSS each perform communication according to CSMA/CA (carrier sense multiple access with collision avoidance). Although the present embodiment is intended for an infrastructure mode in which the AP performs communication with the plurality of STAs, a method according to the present embodiment can also be carried out in an ad hoc mode in which the STAs perform communication directly with each other.

For example, in an IEEE 802.11 system, each apparatus can transmit transmission frames of a plurality of frame types having a common frame formant. The transmission frames are defined by a physical (PHY) layer, a medium access control (MAC) layer, a logical link control (PLC) layer, respectively. The transmission frame of the PHY layer is referred to as "physical protocol data unit (PPDU: PHY protocol data unit)". The PPDU is constituted by a physical layer header (PHY header) containing header information or the like for performing signal processing in the physical layer and a physical service data unit (PSDU: PHY service data unit), which is a data unit that is processed in the physical layer. The PSDU can be constituted by an aggregated-MPDU (A-MPDU), which is an aggregation of MAC protocol data units (MPDUs) that serve as retransmission units in wireless duration.

The PHY header contains a reference signal such as a short training field (STF) that is used in the detection, synchronization, and the like of signals or a long training field (LTF) that is used for the acquisition of channel information for data demodulation and a control signal such as a signal (SIG) containing control information for data demodulation. Further, the STF is classified as a legacy-STF (L-STF), a high throughput-STF (HT-STF), a very high throughput-STF (VHT-STF), or the like according to the corresponding standard. Similarly, the LTF is classified as an L-LTF, an HT-LTF, or a VHT-LTF, and the SIG is classified as an L-SIG, an HT-SIG, or a VHT-SIG. The VHT-SIG is further classified as a VHT-SIG-A or a VHT-SIG-B.

The PPDU is modulated according to the corresponding standard. For example, in the case of the IEEE 802.11 n standard, the PPDU is modulated into an orthogonal frequency division multiplexing (OFDM) signal.

The MPDUs are each constituted by an MAC layer header (MAC header) containing header information or the like for performing signal processing in the MAC layer, an MAC service data unit (MSDU), which is a data unit that is processed in the MAC layer, or a frame body, and a frame check sequence (FCS) that checks a frame for an error. Further, the plurality of MSDUs may be aggregated as the aggregated-MSDU (A-MSDU).

The transmission frame of the MAC layer is broadly classified as any of the following three frame types: a management frame that manages the status of connection between apparatuses and the like, a control frame that manages the status of communication between apparatuses, and a data frame containing actual transmission data. Each of the frame types is further classified as any of a plurality of subframe types. The control frame includes an acknowledge (Ack) frame, a request to send (RTS) frame, a clear to send (CTS) frame, and the like. The management frame includes a beacon frame, a probe request frame, a probe response frame, an authentication frame, an association request frame, an association response frame, and the like. The data frame includes a data frame, a polling (CF-poll) frame, and the like. Each apparatus can grasp the frame type and subframe type of a received frame by reading the contents of a frame control field contained in the MAC header.

The beacon frame contains a field describing intervals at which beacons are transmitted (beacon intervals) and information that identifies the AP (such as SSID: service set identifier). An AP may periodically broadcast beacon frames within the BSS, and an STA may grasp an AP around the STA by receiving a beacon frame. The grasping of an AP by an STA on the basis of a beacon frame that is broadcast from the AP is referred to as "passive scanning". Meanwhile, the searching of an AP by an STA broadcasting a probe request frame within the BSS is referred to as "active scanning". The AP can transmit a probe response frame as a response to the probe request frame, and the contents of description in the probe response frame are equivalent to those of a beacon frame.

After having recognized an AP, an STA performs a connection process on the AP. The connection process is divided into an authentication procedure and an association procedure. The STA transmits an authentication frame (authentication request) to the AP to which the STA would like to connect. Upon receiving the authentication frame, the AP transmits, to the STA, an authentication frame (authentication response) containing a status code indicating, for example, whether the STA is allowed or disallowed authentication. By reading the status code described in the authentication frame, the STA can determine whether the STA is allowed or disallowed authentication by the AP. It should be noted that the AP and the STA may exchange multiple authentication frames with each other.

After the authentication procedure, the STA transmits association request frame in order to perform the association procedure on the AP. Upon receiving the association request frame, the AP determines whether to allow the STA association and transmits an association response frame in order to notify the determination. The association response frame describes a status code indicating whether the connection process is allowed or disallowed and an association identifier (AID) for identifying the STA. By configuring different AIDs for STAs that the AP allowed association, the AP can manage the plurality of STAs.

After the connection process has been performed, the AP and the STAs perform actual data transmissions. In the IEEE 802.11 system, a distributed coordination function (DCF), a point coordination function (PCF), and functions obtained by enhancing these functions (such as an enhanced distributed channel access (EDCA) and a hybrid coordination function (HCF)) are defined. The following description takes, as an example, a case where the AP transmits signals to an STA with the DCF.

In the DCF, the AP and the STA, prior to communication, each perform carrier sense (CS) to confirm the status of use of a wireless channel around the apparatus. For example, in a case of having received, through the wireless channel, a signal that is higher than a predetermined clear channel assessment level (CCA level), the AP, which is a transmitting station, postpones the transmission of a transmission frame through the wireless channel. In the following, the term "busy state" refers to a state in which a signal that is equal to or higher are than the CCA level is detected through the wireless channel, and the term "idle state" refers to a state in which a signal that is equal to or higher than the CCA level is not detected through the wireless channel. Such CS that each apparatus performs according to the electric power of an actually received signal is referred to as "physical carrier sense (physical CS). It should be noted that the CCA level is also referred to as "carrier sense level (CS level)" or "CCA threshold (CCAT)". It should be noted that, in a case of having detected a signal that is equal to or higher than the CCA level, the AP and the STA enter into an operation of modulating at least PHY layer signals.

The AP performs carrier sense for the duration of an inter-frame space (IFS) according to the type of a transmission frame that it transmits, and determines whether the wireless channel is in a busy state or an idle state. The duration for which the AP performs carrier sense varies depending on the frame type and subframe type of a transmission frame that the AP is going to transmit. In the IEEE 802.11 system, a plurality of IFSs of various durations are defined. Examples of IFSs include a short IFS (SIFS) that is used for transmission frames given highest priority, a PCF IFS (PIFS) that is used for transmission frames of comparatively high priority, and a DCF IFS (DIFS) that is used for transmission frames of lowest priority. In a case where the AP transmits a data frame with the DCF, the AP uses a DIFS.

After having waited for the duration of a DIFS, the AP further waits for the duration of random back off time for preventing a frame collision. In the IEEE 802.11 system, random back off time called a contention window (CW) is used. CSMA/CA is based on the premise that a transmission frame that a transmitting station has transmitted is received by a receiving station in the absence of interference from another transmitting station. For that reason, once the transmitting stations transmit transmission frames at the same time, the frames collide with each other, with the result that the receiving station fails in reception. To avoid such a frame collision, each transmitting station waits for the duration of a randomly-set time before the start of a transmission. On determining according to carrier sense that the wireless channel is in an idle state, the AP starts counting down the CW, first acquires a transmission right when the CW becomes 0, and can transmit the transmission frame to the STA. It should be noted that in a case of, while counting down the CW, having determined according to carrier sense that the wireless channel is in a busy state, the AP stops counting down the CW. Then, in a case where the wireless channel has come into an idle state, the AP resumes counting down the remaining CW after the previous IFS.

The STA, which is a receiving station, receives a transmission frame, reads the PHY header of the transmission frame, and demodulates the transmission frame thus received. Then, by reading the MAC header of the signal thus demodulated, the STA can recognize whether the transmission frame s addressed to the STA. It should be noted that the STA can also determine the destination of the transmission frame according to information described in the PHY header (e.g. a group identifier (GID) described in a VHT-SIG-A).

In a case of having determined that the transmission frame thus received is addressed to the STA and having successfully demodulated the transmission frame, the STA must transmit, to the AP, which is a transmitting station, an ACK frame indicating that the frame has been successfully received. The ACK frame is one of the transmission frames of highest priority that are transmitted after waiting for the duration of an SIFS (with no random back off time taken). The AP terminates the series of communications by receiving the ACK frame transmitted from the STA. It should be noted that in a case where the STA has failed to receive the frame, the STA transmits no ACK. Accordingly, in a case of having received no ACK frame from a receiving station for a given period of time (SIFS+ACK frame length) after transmitting a frame, the AP terminates the communication on the assumption that the communication has failed. In this way, the termination of a single communication (also referred to as "burst") of the IEEE 802.11 system is always determined according to the presence or absence of reception of an ACK frame, except for special cases such as the case of transmission of a broadcast signal such as a beacon signal and the case of use of fragmentation by which transmit data is divided.

In a case of having determined that the transmission frame thus received is not addressed to the STA, the STA configures a network allocation vector (NAV) according to the length of the transmission frame as described in the PHY header or the like. The STA does not make a trial communication for the period of time configured for the NAV. That is, since, for the period of time configured for the NAV, the STA performs the same operation as that which is performed in a case where the STA has determined through physical CS that the wireless channel is in a busy state, the control of communication by the NAV is also referred to as "virtual carrier sense (virtual CS)". In addition to being configured according to information described in the PHY header, the NAV is also configured by a request to send (RTS) frame or a clear to send (CTS) frame that are introduced to solve a hidden terminal problem.

As opposed to the DCF with which each apparatus performs carrier sense and autonomously acquires a transmission right, the PCF allows a control station called a point coordinator (PC) to control the transmission right of each apparatus within the BSS. In general, the AP serves as a PC to acquire the transmission rights of the STAs within the BSS.

A period of communication by the PCF includes a contention-free period. (CFP) and a contention period (CP). For the duration of the CP, communication is performed according to the aforementioned DCF, and it is for the duration of the CFP that the PC controls a transmission right. Prior to PCF communication, the AP, which is a PC, broadcasts, within the BSS, a beacon frame describing CFP max duration or the like. It should be noted that a PIFS is used in the transmission of a beacon frame that is broadcast at the start of PCF transmission, and is transmitted without waiting for the CW. A STA having received the beacon frame configures, for the NAV, the CFP max duration described in the beacon frame. After that, until passage of the NAV or reception of a signal that broadcasts the end of the CFP within the BSS (e.g. data frame containing CF-end), the STA may acquire a transmission right only in a case of having received a signal, transmitted from the PC, which signals the acquisition of a transmission right (e.g. a data frame containing CF-poll). It should be noted that since, within the CFP max duration, there occurs no packet collision within the same BSS, none of the STAs takes random back off time, which is used in the DCF.

FIG. 1 is a diagram showing an example of a wireless LAN system configuration. The wireless LAN system includes one or more base station apparatuses and one or more terminal apparatuses. In the example shown in FIG. 1, a base station apparatus 1 and a terminal apparatus 2 constitute a BSS 3. A case where the base station apparatus 1 transmits data to the terminal apparatus 2 is referred to as "downlink (DL)", and a case where the terminal apparatus 2 transmits data to the base station apparatus 1 is referred to as "uplink (UL)".

The base station apparatus 1 regularly transmits a beacon to the terminal apparatus 2. By receiving a beacon from the base station apparatus 1, the terminal apparatus 2 acquires information that is necessary for wireless communication (e.g. a modulation scheme, the type of error-correcting code, and the like).

A wireless LAN apparatus 99 performs carrier sense prior to a data transmission to determine whether a transmission is allowed or disallowed. The term "wireless LAN apparatus 99" here refers to an apparatus that has a wireless LAN function, and includes the base station apparatus 1 and the terminal apparatus 2. The wireless LAN apparatus 99 determines, according to carrier sense, whether a transmission is allowed or disallowed. In the wireless LAN system, each wireless LAN apparatus 99 achieves effective frequency reuse through autonomous distributed control based on carrier sense.

It should be noted that although the following description assumes that the transmission scheme used is OFDM or OFDMA, this is not intended to limit the present invention, and the transmission scheme may be another scheme that is defined by IEEE 802.11 (such as frequency hopping) or any other method (such as CDMA: code division multiple access or FDMA: frequency division multiple access).

Embodiment 1

A wireless communication system according to the present embodiment is described as one that uses OFDM.

Figure 2:
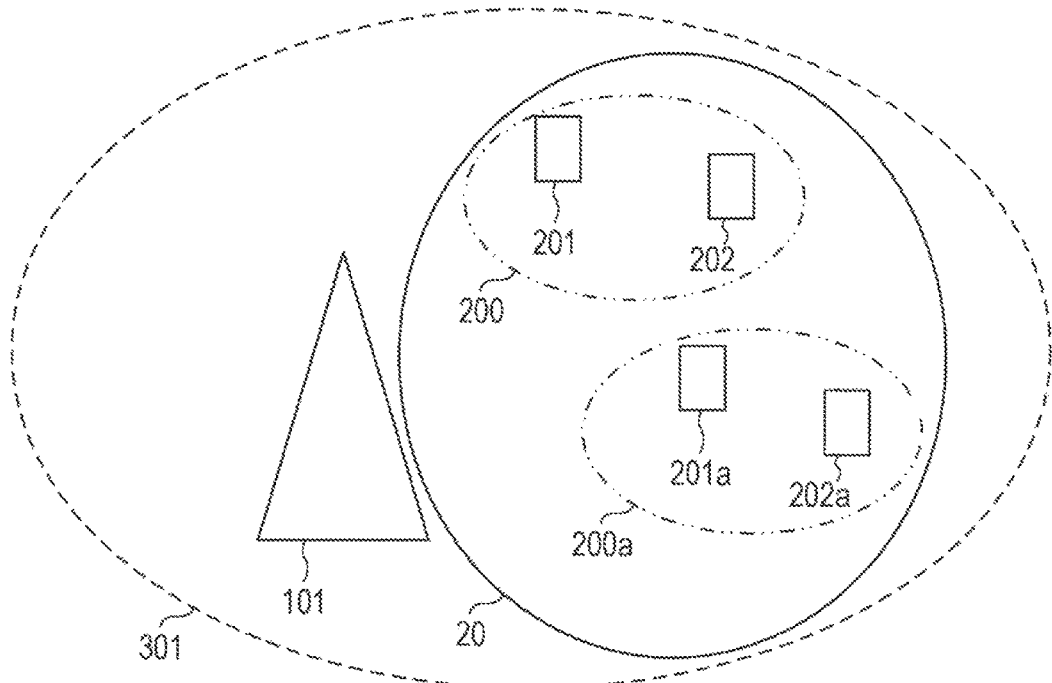
FIG. 2 is a diagram showing an example of a wireless communication system according to the present embodiment.

FIG. 2 is a diagram showing an example of the wireless communication system according to the present embodiment. A base station apparatus 101, terminal apparatuses 201 and 202, and terminal apparatuses 201a and 202a constitute a BSS 301. Note here that the terminal apparatuses 201 and 202 are terminal apparatuses (hereinafter also referred to as "CCA-variable terminal apparatuses") that compatible with the function of rendering the CCA level variable, e.g. that comply with the IEEE 802.11ax standard, and the terminal apparatuses 201a and 202a are terminal apparatuses (hereinafter also referred to as "legacy terminals") that are incompatible with the function of rendering the CCA level variable. Further, in the following, the terminal apparatuses 201 and 202 and the terminal apparatuses 201a and 202a are also collectively referred to as "terminal apparatuses 20". The terminal apparatuses 201 and 202 are also collectively referred to as "terminal apparatuses 200", and the terminal apparatuses 201a and 202a are also collectively referred to as "terminal apparatuses 200a". Further, the base station apparatus 101 and terminal apparatuses 20 are also collectively referred to as "wireless LAN apparatuses 99".

It should be noted that although the terminal apparatuses 200a belong to the BSS 301 (or may for example be in state of being included in a geographical area formed by the BSS 301), the terminal apparatuses 200a may be terminals that are not connected to the base station 101. These terminals may for example be terminals that are compliant with the LTE (Long-Term Evolution) standard formulated by the 3GPP (Third Generation Partnership Project). In the 3GPP, discussions are currently taking place over LTE-U (LTE-Unlicensed), whose possibilities include apparatuses that perform communication using the same frequency band as the wireless LAN apparatuses 99. In general, the wireless LAN apparatuses 99 use unlicensed bands, i.e. bands around the 2.4-GHz band and the 5-GHz band, and the utilization of an unlicensed band in LTE-U is considered. Note, however, that this is not intended to impose frequency band limitations. For example, LAA (License Assisted Access) is considered as a form of utilization of an unlicensed band in an LTE system. The LAA refers to a system that uses unlicensed bands for the purpose of loading off (or reducing the load of) communication in a licensed band that is used in an LTE system. A communication system according to the present invention is intended to protect communication opportunities for the terminal apparatuses 200a, and the terminal apparatuses 200a include terminal apparatuses that are compliant with the LTE standard (including LAA-compatible terminal apparatuses).

It should be noted that the BSS 301 according to the present embodiment may be constituted solely by the base station apparatus 101 and the terminal apparatuses 200. In this case, too, the present invention can be carried out in the same manner as in the case where the BSS 301 is constituted by the base station apparatus 101, the terminal apparatuses 200, and the terminal apparatuses 200*a*.

Figure 3:
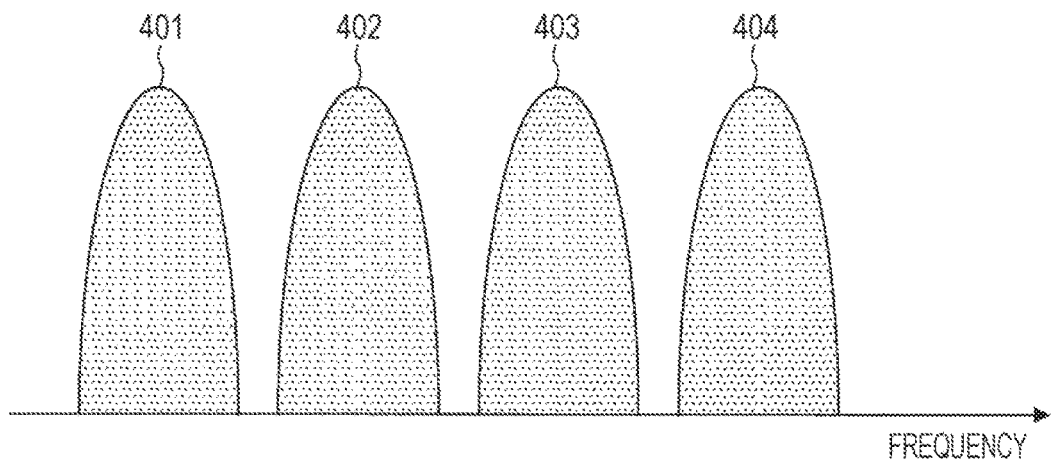
FIG. 3 is a diagram showing examples of channels that are available to a BSS 301.

FIG. 3 is a diagram showing examples of channels (bands, Chs: channels, bands, BWs: bandwidths) that are available to the BSS 301. The channels 401 to 404 represent channels that are available to the BSS 301. In the following, the channels 401 to 404 are also referred to as "channels 400". It is desirable that the base station apparatus 101 select the most favorable channel from among the channels that are available to the BSS 301. The term "favorable channel" refers, for example, to, but is not limited to, a channel that is at the lowest interference level. The interference level may be a temporary-averaged average power or an instantaneously measured instantaneous power. Alternatively, the favorable channel may be determined not according to the magnitude of the interference level but according to ambient geographical information.

The base station apparatus 101 may use the plurality of channels 400 to transmit transmission frames to the terminal apparatuses 20. The base station apparatus 101 may use the plurality of channels 400 in a time division manner or may transmit data through the plurality of channels 400 in a time synchronization manner. For example, a CA (carrier aggregation, channel bonding, channel aggregation) or OFDMA (orthogonal frequency division multiple access) may be used as a method for using the plurality of channels 400 in a time synchronization manner. OFDMA transmission has an advantage in being able to transmit data to the plurality of terminal apparatuses 20 in a time synchronization manner. It should be noted that the wireless communication system according to the present embodiment is premised on a system in which the base station apparatus 101 uses the plurality of channels 400 in a time division manner.

The base station apparatus 101 can perform scheduling (assignment) as to which channel to use to transmit data to each of the terminal apparatuses 20. For example, the base station apparatus 101 may assign the channel 401 to the terminal apparatuses 200 and assign the channel 402 to the terminal apparatuses 200*a*.

The wireless LAN apparatuses 99 determine, according to carrier sense, whether transmissions are allowed or disallowed. The CCA level may take on the same value for the wireless LAN apparatuses 99 or may take on different values for each base station apparatus 101, the terminal apparatuses 200, and the terminal apparatuses 200*a*. It should be noted that while the terminal apparatuses 200*a* according to the present embodiment perform carrier sense using a constantly-fixed CCA level, the base station apparatus 101 and the terminal apparatus 200 may use different CCA levels for each separate resource such as time, frequency, or space or for each separate destination terminal.

In general, while raising the CCA level widens a range of acceptable interference levels and thus increases transmission opportunities for the terminal apparatuses, raising the CCA level causes an increase in interference level on the receiving side and thus raises concern about deterioration in communication quality and an increase in the number of reception errors. However, at a certain interference level, it is expected that a significant increase in the number of reception errors will be alleviated by functions and effects that are peculiar to wireless communication, such as adaptive modulation and a capture effect.

In the wireless communication system according to the present embodiment, the terminal apparatuses 200 are described as ones that perform carrier sense using a raised CCA level Cax, and the terminal apparatuses 200*a* are described as ones that perform carrier sense using C1. That is, although Cax>C1, this not intended to limit the wireless communication system according to the present embodiment, and the relationship of CCA level between the terminal apparatuses 200 and the terminal apparatuses 200*a* may be a condition other than that mentioned above. Further, Cax may adaptively vary (CCA level dynamic control) depending on resources such as time, frequency, and space. Further, in a case where the terminal apparatuses 200 perform CCA level dynamic control, the base station apparatus 101 can notify the terminal apparatuses 200 of information regarding a CCA-variable range.

The execution of carrier sense by the terminal apparatuses 200 at Cax makes it possible to increase transmission opportunities but, at the same time, increases the interference level of the BSS 301. The terminal apparatuses 200*a* perform carrier sense at C1 and therefore cannot have increased transmission opportunities, and the terminal apparatuses 200*a* suffer from further deterioration in communication quality due to the influence of an increase in interference level exerted by the terminal apparatuses 200. Furthermore, the influence of the increase in interference level by the terminal apparatuses 200 also raises concern about a further decrease in the rate of acquisition of transmission opportunities, with the possible result that the terminal apparatuses 200*a* remarkably deteriorate in throughput. The wireless communication system according to the present embodiment relates to an invention that solves the foregoing problems by designating, as a CCA-variable channel (s), only one or more of the channels 400 that are available to the BSS 301 and notifying the terminal apparatuses 200 of first CCA-variable channel instruction information through the base station apparatus 101.

It should be noted that although the following description gives consideration to uplink transmissions, an aspect of the present embodiment is not limited to this, and similar operations are possible in downlink transmissions, too.

Figure 4:
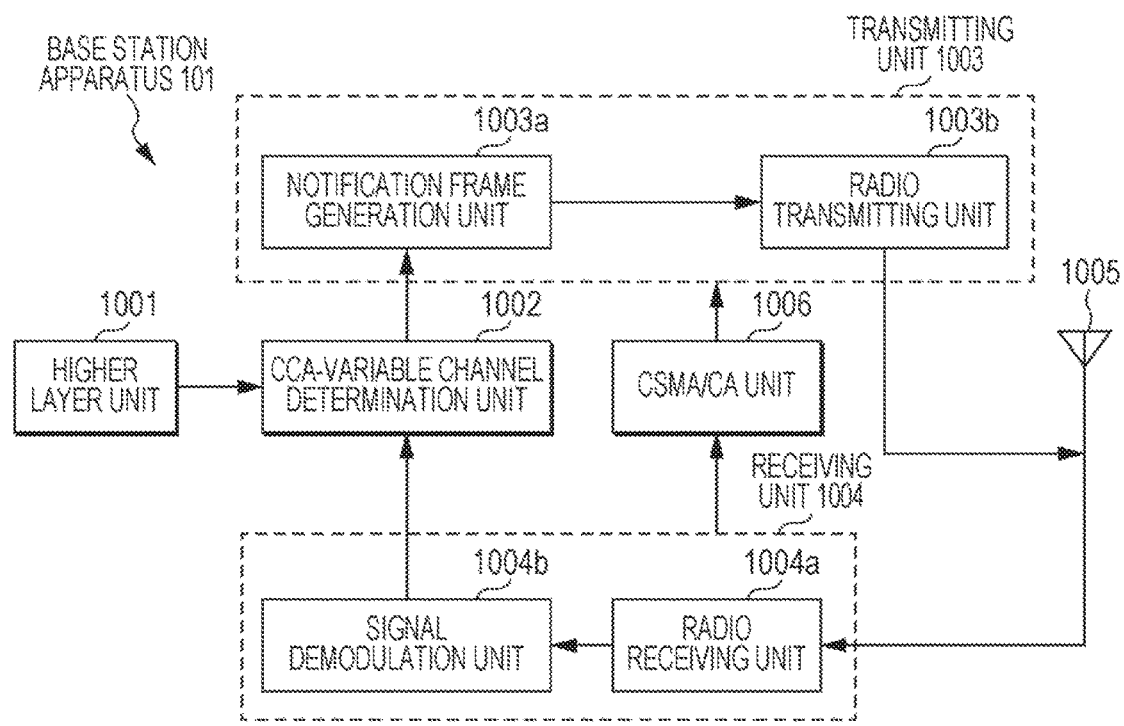
FIG. 4 is a diagram showing an example of an apparatus configuration of a base station apparatus 101.

FIG. 4 is a diagram showing an example of an apparatus configuration of the base station apparatus 101. The base station apparatus 101 includes a higher layer unit 1001, a CCA-variable channel determination unit 1002, a transmitting unit 1003, a receiving unit 1004, and an antenna unit 1005.

The higher layer unit 1001 is connected to another network and has a function of notifying the CCA-variable channel determination unit 1002 of information. Note here that the information of which the higher layer unit 1001 notifies the CCA-variable channel determination unit 1002 may include information that may be used in CCA-variable channel determination, such as information regarding channels that are available to the BSS 301 to which the base station 101 belongs and information regarding the proportions of the terminal apparatuses 200 and the terminal apparatuses 200*a*. Further, the higher layer unit 1001 also has a function of analyzing MAC headers and data contained in transmission frames transmitted from the terminal apparatuses 20.

The CCA-variable channel determination unit 1002 determines a CCA-variable channel, generates first CCA-variable channel instruction information, and notifies the transmitting unit 1003 of the first CCA-variable channel instruction information. The CCA-variable channel determination unit 1002 and the first CCA-variable channel instruction information will be described later.

The transmitting unit 1003 includes a notification frame generation unit 1003*a* and a radio transmitting unit 1003*b*. The transmitting unit 1003 determines, according to transmission allow/disallow determination information notified from the CSMA/CA unit 1006, whether a transmission is allowed or disallowed.

The notification frame generation unit 1003a has a function of generating a notification frame for notifying the terminal apparatuses 200 of the first CCA-variable channel instruction information. The base station apparatus 101 can use, as a notification frame for use in first CCA-variable channel instruction information notification, a management frame such as a beacon signal or a probe response signal, a control frame such as an RTS/CTS (request to send/clear to send), a data frame that transmits transmit data, or the like. The beacon signal is a management frame for the base station apparatus 101 to regularly notify the terminal apparatuses 20 of broadcast information, and is composed of a plurality of information elements. The information elements of which the beacon signal composed may include an information element regarding the capability of the modulation scheme, an information element regarding power control, a QoS (quality of service) related information element, an information element regarding a switch from using one channel to another, and the like. It should be noted that the beacon signal does not need to contain all of the information elements named above and may contain an information element other than the information elements named above.

The notification frame generation unit 1003a can insert the first CCA-variable channel instruction information into the notification frame (e.g. into an information element of a beacon signal, a probe response, an authentication response, or an association response, into the MAC header or PHY header of the notification frame, or into a data frame). The notification frame generated by the notification frame generation unit 1003a is subjected to precoding filter multiplication, error correcting coding, a mapping process, and the like and then notified to the radio transmitting unit 1003b.

The radio transmitting unit 1003b converts the notification frame generated by the notification frame generation unit 1003a into a signal in a radio-frequency (RF) band and thereby generates a radio-frequency signal. Processes that the radio transmitting unit 1003b performs include digital-analog conversion, filtering, frequency conversion from a baseband to an RF band, and the like.

The receiving unit 1004 includes a radio receiving unit 1004a and a signal demodulation unit 1004b. The receiving unit 1004 generates information regarding an interference level from an interfering signal received by the antenna unit 1005 and notifies the CSMA/CA unit 1006 of the information.

The radio receiving unit 1004a converts an RF-band signal received by the antenna unit 1005 into a physical channel signal and thereby generates a baseband signal. Processes that the radio receiving unit 1004a performs include frequency conversion from an RF band into a baseband, filtering, and analog-digital conversion.

The signal demodulation unit 1004b demodulates the baseband signal generated by the radio receiving unit 1004a and extracts an MAC frame. Demodulation processes than the signal demodulation unit 1004b performs include channel equalization, demapping, error correcting decoding, and the like.

The antenna unit 1005 has a function of transmitting the radio-frequency signal generated by the radio transmitting unit 1003b into wireless space toward the STAs 20. Further, the antenna unit 1005 has a function of receiving radio-frequency signals transmitted from the STAs 200. Further, the antenna unit 1005 has a function of, in a case where the AP 101 executes carrier sense, receiving the channels of signals that are present in the wireless space.

The CSMA/CA unit 1006 has a CSMA/CA operation function. The CSMA/CA unit 1006 determines, according to carries sense using the information regarding the interference level as generated by the receiving unit 1004, whether the base station apparatus 101 is allowed or disallowed to perform a transmission, and generates transmission allow/disallow determination information. Let it be assumed, for example, that the CSMA/CA unit 1006 has acquired a received interfering power ICA as the information regarding the interference level. The CSMA/CA unit 1006 uses a CCA level Cva. In a case where ICA<Cva is true, the CSMA/CA unit 1006 determines that the base station apparatus 101 is allowed to perform a transmission. In a case where ICA<Cva is false, the CSMA/CA unit 1006 determines that the base station apparatus 101 waits to perform a transmission. Although the following description assumes that the CSMA/CA unit 1006 executes carrier sense using the CCA level, this is not intended to limit the present embodiment. The present embodiment is applicable to another method for determining, according to carrier sense, whether a transmission is allowed or disallowed.

An example of a carrier sense operation that the aforementioned CSMA/CA unit executes is based on the premise that the wireless LAN apparatuses 99 make the CCA level Cva or the CCA level C1 known. For example, under the conventional IEEE 802.11 standards, the CCA level takes on a fixed value C1. Examples of carrier sense methods that the IEEE 802.11 standards employ include two types of carrier sense method: CCA-SD (clear channel assessment-signal detection) and CCA-ED (clear channel assessment energy detection). CCA-SD is an algorithm that is applicable in a case where an interfering signal can be demodulated, and in the case of execution of a transmission in the 20-MHz band, the CCA level takes on −82 dBm. CCA-ED is an algorithm that is applicable regardless of whether an interfering signal can be demodulated, and in the case of execution of a transmission in the 20-MHz band, the CCA level takes on −62 dBm.

In a system where, as in the case of the IEEE 802.11 standards like, wireless communication apparatuses determine, in an autonomous distributed manner, whether transmissions are allowed or disallowed, there may occur a collision of transmissions due to simultaneous execution of transmissions by the wireless communication apparatuses. In order to avoid such a collision, a wireless communication apparatus trying to transmit data waits for the duration of random back off time to transmit the data.

Figure 5:
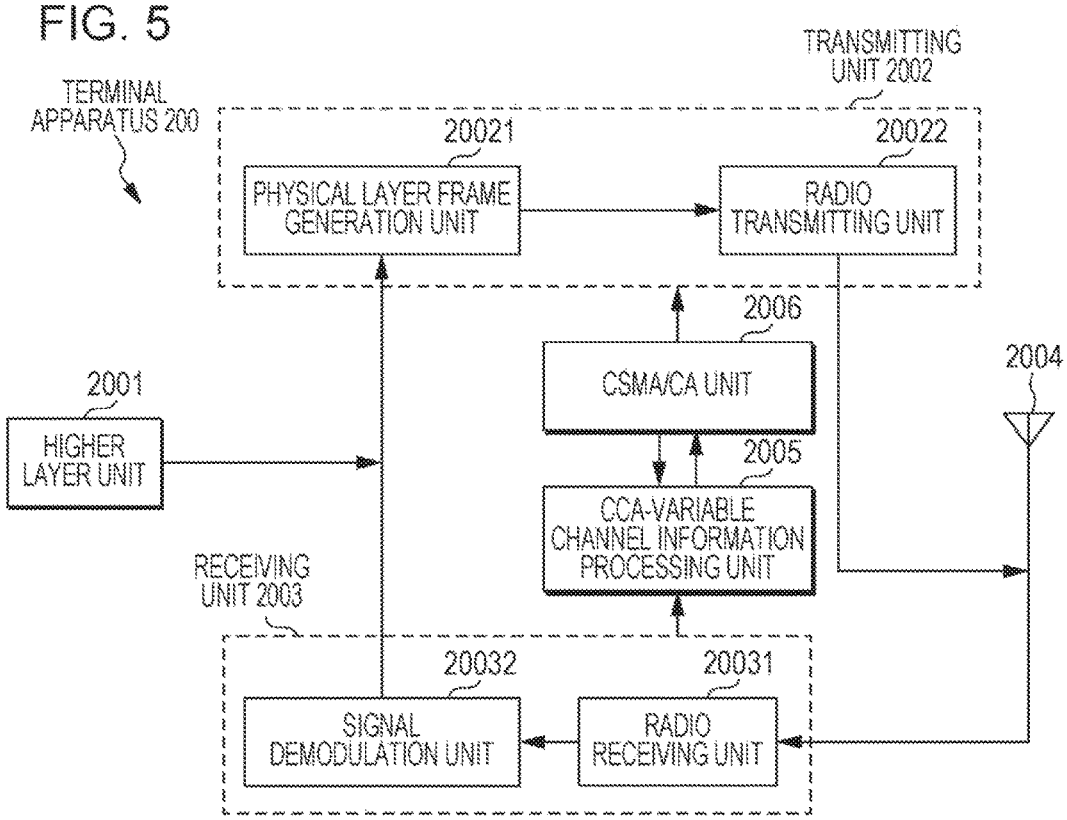
FIG. 5 is a diagram showing an example of an apparatus configuration of a terminal apparatus 200.

FIG. 5 is a diagram showing an example of an apparatus configuration of each of the terminal apparatuses 200. The terminal apparatus 200 includes a higher layer unit 2001, a transmitting unit 2002, a receiving unit 2003, an antenna unit 2004, a CCA-variable channel information processing unit 2005, and a CSMA/CA unit 2006. Note here that the transmitting unit 2002, the receiving unit 2003, and the antenna unit 2004 constitute a radio unit.

The higher layer unit 2001 generates higher layer (upper layer, IP layer, TCP layer, session presentation layer, application layer) data. The higher layer unit 2001 notifies the transmitting unit 2002 of the transmit data thus generated. Further, the higher layer unit 2001 also has a function of notifying a higher layer of demodulated data demodulated by the receiving unit 2003.

The transmitting unit 2002 further includes a physical layer frame generation unit 20021 and a radio transmitting unit 20022. The transmitting unit 2002 determines, according to transmission allow/disallow determination information generated by the CSMA/CA unit, whether a transmission is allowed or disallowed.

The physical layer frame generation unit 20021 applies precoding filter multiplication, error correcting coding, a mapping process, and the like to the transmit data and thereby generates a physical layer frame.

The radio transmitting unit 20022 converts the physical layer frame generated by the physical layer frame generation unit 20021 into a signal in a radio-frequency band and thereby generates a radio-frequency signal. Processes that the radio transmitting unit 20022 performs include digital-analog conversion, filtering, frequency conversion from a baseband into an RF band.

The receiving unit 2003 includes a radio receiving unit 20031 and a signal demodulation unit 20032. The receiving unit 2003 generates information regarding an interference level from an interfering signal received by the antenna unit 2004 and notifies the CCA-variable channel information processing unit 2005 of the information.

The radio receiving unit 20031 converts an RF-band signal received by the antenna unit 2004 into a physical channel signal and thereby generates a baseband signal. Processes that the radio receiving unit 20031 performs include frequency conversion from an RF band into a baseband, filtering, and analog-digital conversion.

The signal demodulation unit 20032 demodulates the baseband signal generated by the radio receiving unit 20031 and extracts an MAC frame. Demodulation processes that the signal demodulation unit 20032 performs include channel equalization, demapping, error correcting decoding, and the like. Further, the signal demodulation unit also has a function of extracting the first CCA-variable channel instruction information from the MAC frame thus demodulated.

The antenna unit 2004 has a function of transmitting the radio-frequency signal generated by the radio transmitting unit 20022 into wireless space toward the base station apparatus 101. Further, the antenna unit 2004 has a function of receiving a radio-frequency signal transmitted from the base station apparatus 101. Further, the antenna unit 2004 has a function of, in a case where the terminal apparatus 20 executes carrier sense, receiving the channels of signals that are present in the wireless space.

The CCA-variable channel information processing unit 2005 has a function of, in accordance with the first CCA-variable channel instruction information extracted by the signal demodulation unit 20032, changing from using one channel to using another. How the CCA-variable channel information processing unit 2005 operates will be described in detail later.

The CSMA/CA unit 2006 has a CSMA/CA operation function. The CSMA/CA unit 2006 determines, according to carries sense using the information regarding the interference level as generated by the receiving unit 2003, whether the terminal apparatus 200 is allowed or disallowed to perform a transmission, and generates transmission allow/disallow determination information. The transmission allow/disallow determination information generated by the CSMA/CA unit 2006 is notified to the transmitting unit 2002 and the CCA-variable channel information processing unit 2005.

Figure 6:
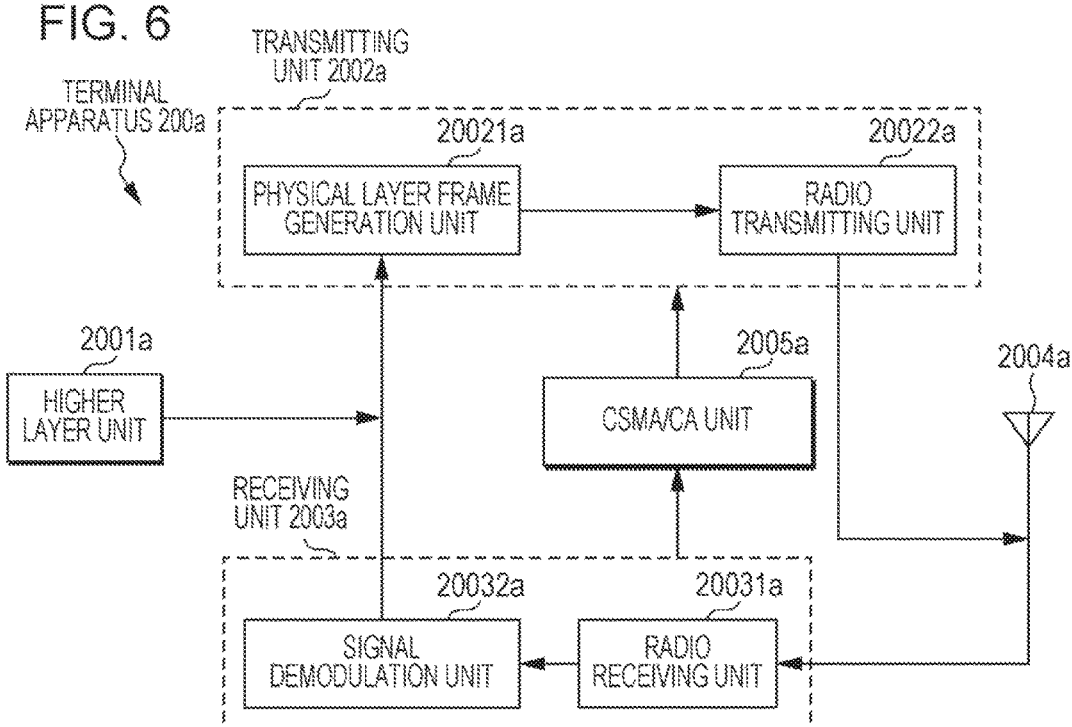

FIG. 6 is a diagram showing an apparatus configuration of each of the terminal apparatuses 200a. The terminal apparatus 200a includes a higher layer unit 2001a, a transmitting unit 2002a, a receiving unit 2003a, an antenna unit 2004a, and a CSMA/CA unit 2005a. The terminal 200a differs from the terminal apparatus 200 in that the terminal apparatus 200a includes no CCA-variable channel information processing unit.

The higher layer unit 2001a, the transmitting unit 2002a, the receiving unit 2003a, the antenna unit 2004a, and the CSMA/CA unit 2005a have the same functions as the higher layer unit 2001, the transmitting unit 2002, the receiving unit 2003, the antenna element 2004, and the CSMA/CA unit 2006, respectively, of the terminal apparatus 200.

The transmitting unit 2002a further includes a physical layer frame generation unit 20021a and a radio transmitting unit 20022a. The physical layer frame generation unit 20021a and the radio transmitting unit 20022a have the same functions as the physical layer frame generation unit 20021 and the radio transmitting unit 20022, respectively, of the terminal apparatus 200.

The receiving unit 2003a further includes a radio receiving unit 20031a and a signal demodulation unit 20032a. The radio receiving unit 20031a and the signal demodulation unit 20032a have the same functions as the radio receiving unit 20031 and the signal demodulation unit 20032, respectively, of the terminal apparatus 200.

As described above, the BSS 301 is constituted by the base station apparatus 101, which has the function of rendering the CCA level variable, the terminal apparatuses 200, which have the function of rendering the CCA level variable, and the terminal apparatuses 200a, which do not have the function of rendering the CCA level variable. While the base station apparatus 101 and the terminal apparatuses 200 are expected to increase throughput by changing the CCA level, the terminal apparatuses 200a cannot change the CCA level and therefore cannot increase throughput. This raises concern about a widening of unfairness among the terminals. For example, the base station apparatus 101 and the terminal apparatuses 200 are expected to acquire more transmission opportunities by raising the CCA level.

While raising the CCA level is expected to cause a rise in interference level and deterioration in communication quality, the acquisition of more transmission opportunities is considered to increase throughput and improve QoS. However, in the case of the terminal apparatuses 200a, which cannot change the CCA level, the increase in interference level is considered to not only cause deterioration in communication quality but also reduce the number of transmission opportunities that can be acquired.

In order to solve such problems, it is important for the terminal apparatuses 200 and the terminal apparatuses 200a to use separate radio resources. The present invention is characterized in that the base station apparatus 101 designates CCA-variable channels for the terminal apparatuses 200a. The terminal apparatuses 200 can change the CCA level only in a case of using CCA-variable channels designated by the base station apparatus 101.

The CCA-variable channel determination unit 1002 determines a CCA-variable channel. A method for determining a CCA-variable channel may include, for example, randomly selecting an available channel or selecting a channel that is good in communication quality. Alternatively, the method may be based, for example, on information regarding the proportion of CCA-variable terminal apparatuses or legacy terminal apparatuses that are allocated on their respective channels. In addition, the base station apparatus 101 can designate, as a CCA-changeable channel of the BSS 301, a channel that is the same as a CCA-variable channel designated by a base station apparatus belonging to a neighboring BSS and can designate another channel as a CCA-variable channel. Further, the CCA-variable channel determination unit 1002 may select one or more CCA-variable channels. The base station apparatus 101 generates first CCA-variable channel instruction information constituted by information regarding a CCA-variable channel and notifies the terminal apparatuses 200 of the first CCA-variable channel instruction information.

It should be noted that information regarding a CCA-variable range (CCA-variable offset) may be configured for a CCA-variable channel designated by the base station apparatus 101. The base station apparatus 101 can generate first. CCA-variable offset information using the information regarding the CCA-variable range and notify the terminal apparatuses 200 of the first CCA-variable offset information. In a case where the base station apparatus 101 has designated a plurality of channels as CCA-variable channels, the base station apparatus 101 can configure different CCA-variable offsets for each separate channel. The notification of the first CCA-variable offset information to the terminal apparatuses 200 by the base station apparatus 101 can restrict the variable range of a CCA level of the terminal apparatuses 200, thus making it possible, for example, to suppress a significant rise in interference with a neighboring BSS. Further, the base station apparatus 101 may notify the terminal apparatuses 200 of both the first CCA-variable offset information and the first CCA-variable channel instruction information or notify the terminal apparatuses 200 of only the first CCA-variable channel instruction information.

It should be noted that the first CCA-variable channel instruction information and the first CCA-variable offset information may take on the same value or different values for the terminal apparatuses 200.

The CCA-variable channel information processing unit 2005 has a function of performing frequency switching control in accordance with the CCA-variable channel instruction information notified by the base station apparatus 101 and the transmission allow/disallow determination information generated by the CSMA/CA unit 2006.

For example, in a case where the channel being used is not designated as a CCA-variable channel, the CCA-variable channel information processing unit 2005 can instruct the CSMA/CA unit 2006 to switch to a CCA-variable channel. The CSMA/CA unit 2006 executes carrier sense on the channel as instructed and generates transmission allow/disallow determination information. The CCA-variable channel information processing unit 2005 executes a switch to a CCA-variable channel in accordance with the transmission allow/disallow determination information. The terminal apparatus 200 may alternatively switch to a CCA-variable channel without transmission allow/disallow determination information. Note, however, that in a case where the CCA-variable channel to which the terminal apparatus 200 switches is busy at the time, the terminal apparatus 200 must wait before transmission.

As described above, the base station apparatus 101 can notify the terminal apparatuses 200 of a CCA-variable channel. However, the terminal apparatuses 200a do not have a function of analyzing first CCA-variable channel instruction information. For that reason, the base station apparatus 101 cannot notify the terminal apparatuses 200a of a CCA-variable channel. This problem can be solved by using, for the terminal apparatuses 200a, a channel switch announcement information element defined by the conventional IEEE 802.11 standards. A beacon signal that the base station apparatus 101 may contain the channel switch announcement information element. The base station apparatus 101 can manage the use of channels for the terminal apparatuses 20 by using the channel switch announcement information element.

Figure 7:
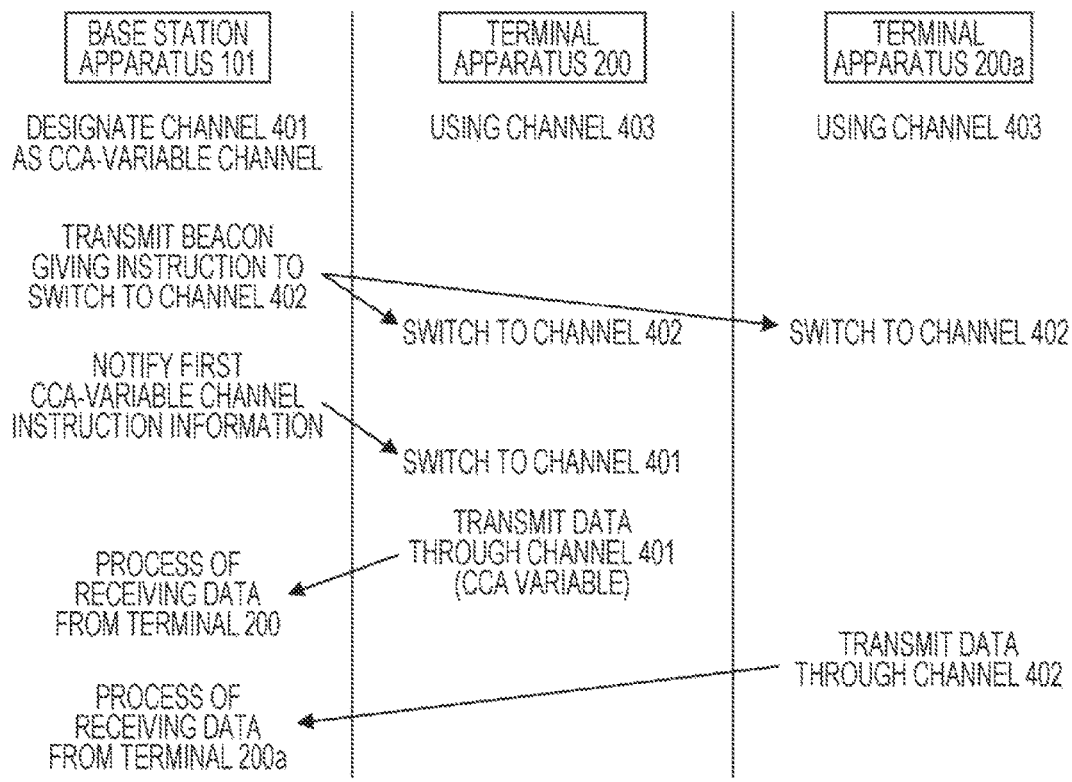
FIG. 7 is a timing chart showing an example of the flow of processes that the base station apparatus 101, the terminal apparatus 200, and the terminal apparatus 200a perform.

FIG. 7 is a timing chart showing an example of the flow of processes that the base station apparatus 101, a terminal apparatus 200, and a terminal apparatus 200a perform. The terminal apparatus 200 and the terminal apparatus 200a are using the same channel (e.g. the channel 403). First, in order to avoid an environment where the terminal apparatus 200 and the terminal apparatus 200a are mixed, the base station apparatus 101 designates the channel 401 as a CCA variable channel. Then, the base station apparatus 101 transmits a beacon signal giving an instruction to switch to a channel other than the CCA-variable channel (e.g. to the channel 402).

At this time, the beacon signal transmitted by the base station apparatus transmits contains a channel switch announcement information element giving an instruction to switch to the channel 402. Upon receiving the beacon signal transmitted by the base station apparatus 101, the terminal apparatus 200 and the terminal apparatus 200a execute a process of switching to the channel 402. Then, the base station apparatus 101 notifies first CCA-variable channel instruction information. In accordance with the first CCA-variable channel instruction information, the terminal apparatus 200 executes a switch to the channel 401. In the result, the terminal apparatus 200 executes a data transmission through the channel 401, and the terminal apparatus 200a executes a data transmission through the channel 402. The execution of the aforementioned process causes the terminal apparatus 200 and the terminal apparatus 200a to establish communication through separate channels, thus making it possible to protect the CCA-invariable terminal apparatus 200a.

As described above, by carrying out the present embodiment, the base station apparatus 101 allows the terminal apparatuses 200 and the terminal apparatuses 200a within the BSS 301 to be allocated on different channels. The terminal apparatuses 200 can execute a CCA-variable operation by switching to a CCA-variable channel. For that reason, the terminal apparatuses 200 are expected to increase throughput by enhancing channel utilization efficiency. Further, the terminal apparatuses 200a, which are allocated on a channel whose CCA level cannot be changed, can avoid deterioration in throughput thanks to the absence of the influence of an increase in interference attributed to the CCA-variable terminal apparatuses.

The base station apparatus 101 can notify the terminal apparatuses 200 of second CCA-variable channel instruction information by which a CCA level for performing carrier sense on the channels 400 managed by the BSS 301 cannot be changed or the CCA level is changed back to the default.

For example, in a case where the base station apparatus 101 regularly notifies the terminal apparatuses 200 of the first CCA-variable channel instruction information, the first CCA-variable offset information, or both through beacon signals or the like, the base station apparatus 101 can terminate the regular notification of the first CCA-variable channel instruction information, the first CCA-variable offset information, or both by notifying the terminal apparatuses 200 of the second CCA-variable channel instruction information. The terminal apparatuses 200 can immediately change the CCA level back to the default in accordance with the second CCA-variable channel instruction information notified by the base station apparatus 101.

Second Embodiment

A wireless communication sys according to the present embodiment assumes a system in which data is transmitted toward a single destination by using channel aggregation whereby a plurality of channels are used in a time synchronization manner (i.e. used in aggregation). Under the conventional IEEE 802.11 standards, a plurality of contiguous channels can be used in combination. Note, however, that, in the present embodiment, a plurality of non-contiguous channels may be aggregated to transmit data.

In channel aggregation, a plurality of channels are simultaneously used. These channels are generally classified into primary channels and secondary channels.

Figure 8:
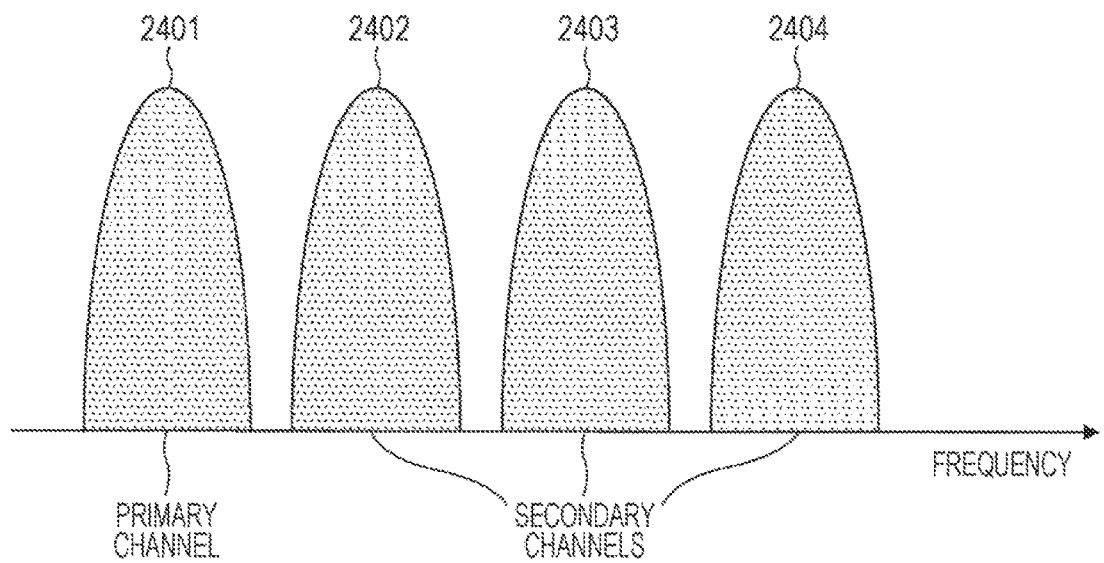
FIG. 8 is a diagram showing examples of channels in a case where channel aggregation is used.

FIG. 8 is a diagram showing examples of channels in a case where channel aggregation is used. As shown in FIG. 8, for example, the channel 2401 is a primary channel and the channels 2402, 2403, and 2404 are secondary channels. In the following, the channels 2401, 2402, 2403, and 2404 are also collectively referred to as "channels 2400".

Figure 9:
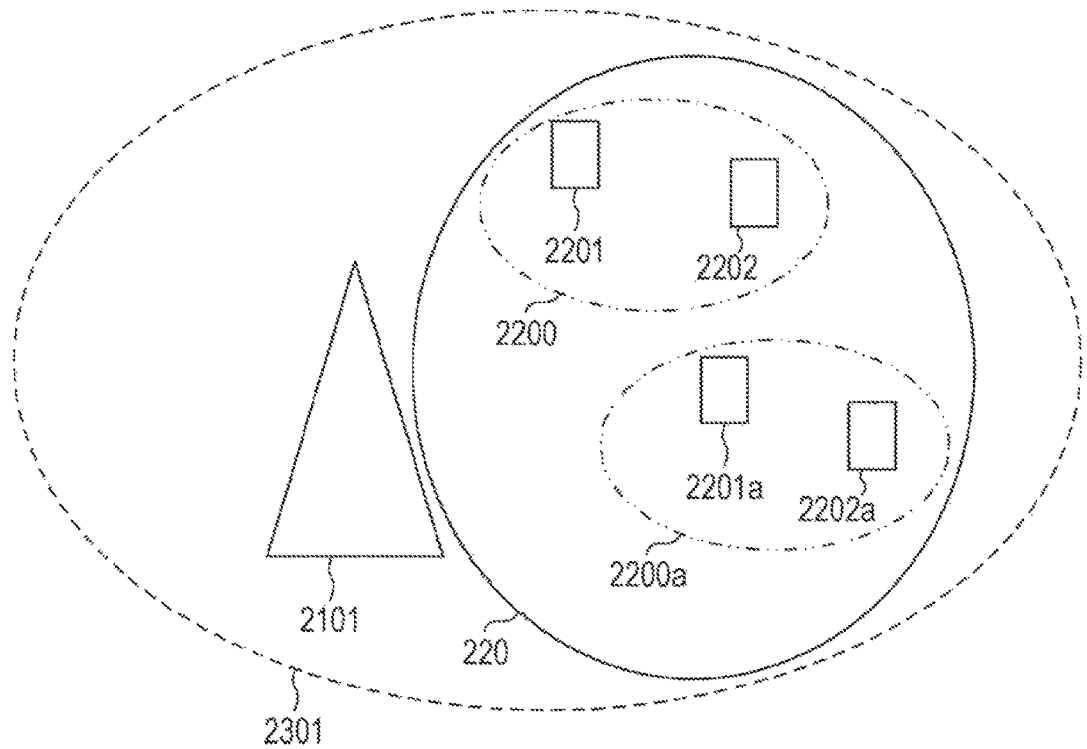
FIG. 9 is a diagram schematically showing a wireless communication system according to the present embodiment.

FIG. 9 is a diagram schematically showing the wireless communication system according to the present embodiment. A base station apparatus 2101, terminal apparatuses 2201 and 2202, and terminal apparatuses 2201a and 2202a constitute a BSS 2301. In the following, the terminal apparatuses 2201 and 2202 are also referred to as "terminal apparatuses 2200", and the terminal apparatuses 2201a and 2202a are also referred to as "terminal apparatuses 2200a". Further, the terminal apparatuses 2200 and the terminal apparatuses 2200a are also collectively referred to as "terminal apparatuses 220". The base station apparatus 2101 and the terminal apparatuses 220 according to the present embodiment are identical in operation to the base station apparatus 101 and the terminal apparatuses 20 according to the first embodiment, respectively. Note, however, that the terminal apparatuses 2200 according to the present embodiment are terminal apparatus that are capable of changing the CCA level and have a channel aggregation function and the terminal apparatuses 2200a are terminal apparatuses other than the terminal apparatuses 2200. It should be noted that, as with the terminal apparatuses 200a according to the first embodiment, the terminal apparatuses 2200a according to the present embodiment include terminal apparatuses that are compliant with the LTE standard.

It should be noted that the BSS 2301 according to the present embodiment may be constituted solely by the base station apparatus 2101 and the terminal apparatuses 2200. In this case, too, the present invention can be carried out in the same manner as in the case where the BSS 2301 is constituted by the base station apparatus 2101, the terminal apparatuses 2200, and the terminal apparatuses 2200a.

Figure 10:
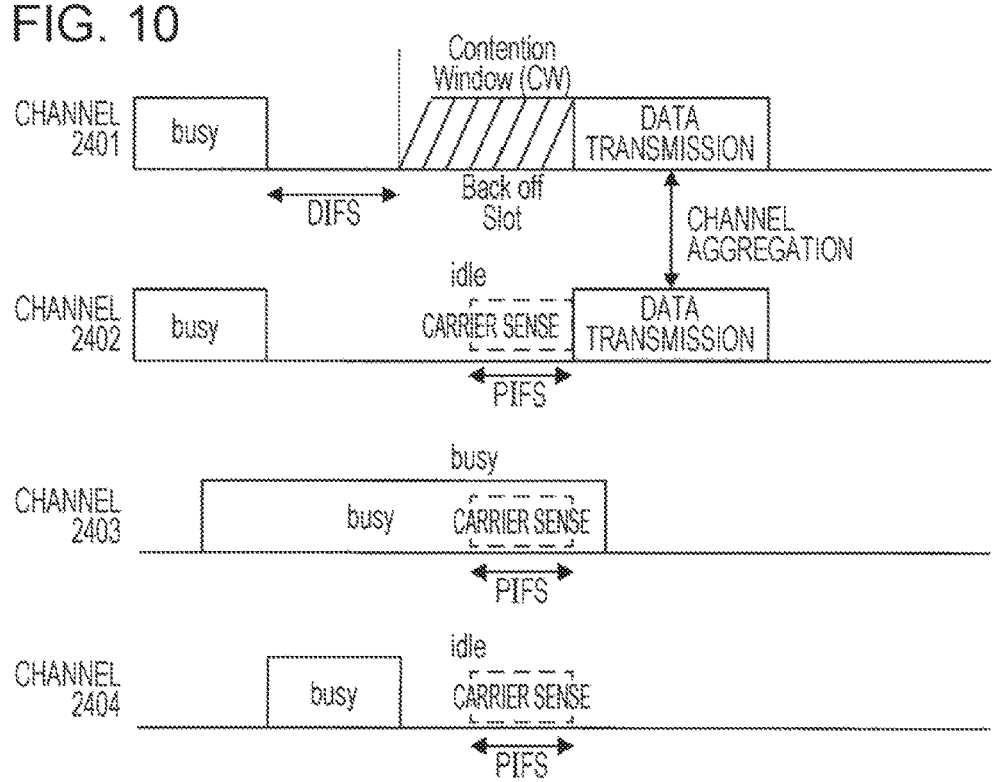
FIG. 10 is a diagram showing an example of an access mechanism in a case where a terminal apparatus 2200 uses channel aggregation defined by IEEE 802.11.

FIG. 10 is a diagram showing an example of an access mechanism in a case where a terminal apparatus 2200 uses channel aggregation defined by IEEE 802.11. FIG. 10 illustrates an example of a case where the primary channel of the terminal apparatus 2200 is the channels 2401 and the secondary channels of the terminal apparatus 2200 are the channels 2402 to 2404. In performing a transmission operation through the primary channel, the terminal apparatus 2200 waits for the duration time corresponding to a DIFS before transmission and executes carrier sense. It should be noted that, instead of using the DIFS, the terminal apparatus 2200 may use a wait before-transmit period (AIFS: attribution inter-frame space) that takes on different values according to a parameter (AC: access category) that indicates the priority of a transmission frame. Then, the terminal apparatus 2200 waits for the duration of random back off time. After that, if the primary channel is idle, the terminal apparatus 2200 proceeds to the transmission operation.

In so doing, the terminal apparatus 2200 executes carrier sense on the channel 2402 to 2404 in parallel for the duration of a period of time corresponding to a PIFS. This means that the terminal apparatus 2200 performs carrier sense on the secondary channels for the duration of the PIFS period immediately before the end of the random back off time on the primary channel. In FIG. 10, the channels 2402 and 2404 are idle, and the channel 2403 is busy. In IEEE 802.11 systems, which do not support simultaneous transmissions through non-contiguous channels with some exceptions (the IEEE 802.11ac standard supports the use of non-contiguous channels of 80 MHz+80 MHz), data transmissions are performed through the channels 2401 and 2402.

Although FIG. 10 illustrates an operation that complies with the IEEE 802.11 standards, this is not intended to limit the present embodiment. An operation according to the present embodiment may be data communication through non-contiguous channels. Examples of communication schemes through discontinuous channels include non-contiguous OFDM and the like.

Figure 11:
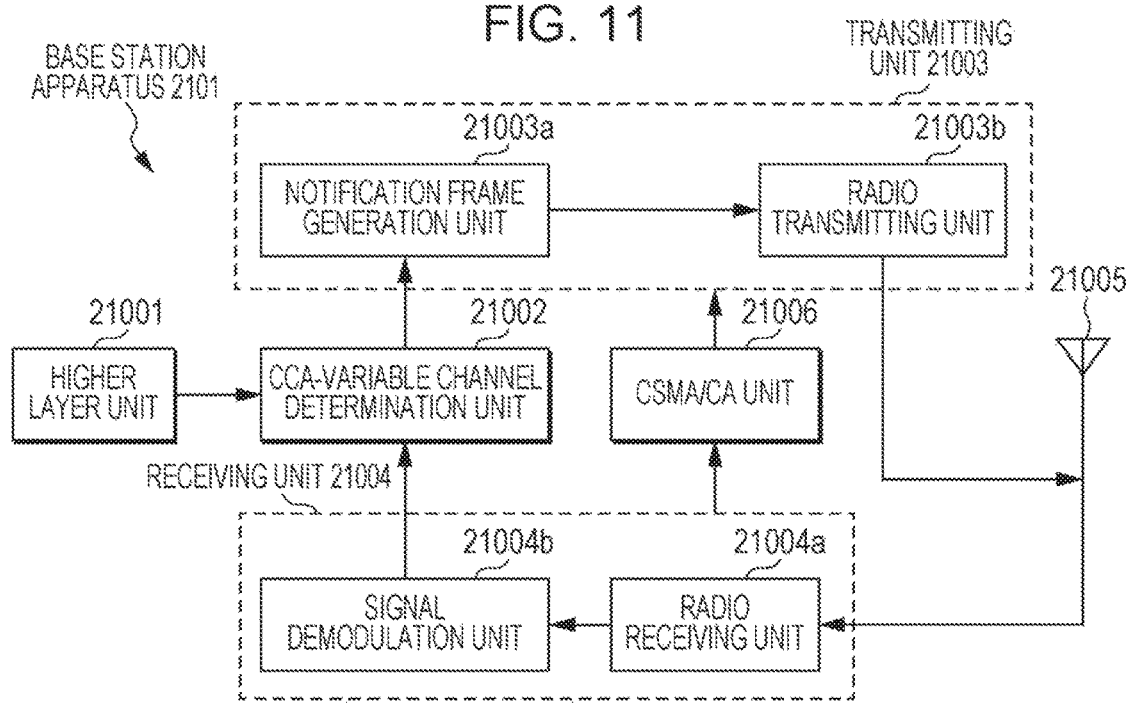
FIG. 11 is a diagram showing an example of an apparatus configuration of a base station apparatus 2101 according to the present embodiment.

FIG. 11 is a diagram showing an example of an apparatus configuration of the base station apparatus 2101 according to the present embodiment. The base station apparatus 2101 includes a higher layer unit 21001, a CCA-variable channel determination unit 21002, a transmitting unit 21003, a receiving unit 21004, an antenna unit 21005, and a CSMA/CA unit 21006.

The higher layer unit 21001, the transmitting unit 21003, the receiving unit 21004, and the antenna unit 21005 are identical in operation to the higher layer unit 1001, the transmitting unit 1003, the receiving unit 1004, and the antenna unit 1005, respectively, of the base station apparatus 101 according to the first embodiment.

The transmitting unit 21003 includes a notification frame generation unit 21003a and a radio transmitting unit 21003b, which are identical in operation to the notification frame generation unit 1003a and the radio transmitting unit 1003b according to the first embodiment, respectively.

The receiving unit 21004 includes a radio receiving unit 21004a and a signal demodulation unit 21004b, which are identical in operation to the radio receiving unit 1004a and the signal demodulation unit 1004b according to the first embodiment, respectively.

The CCA-variable channel determination unit 21002 determines a CCA-variable channel and determines a CCA-variable range on the channel. It should be noted that the CCA-variable channel determination unit 21002 according to the present embodiment mainly determines CCA-variable channels for the primary and secondary channels of the BSS 2301 to which the base station apparatus 2101 belongs. How the CCA-variable channel determination unit 21002 operates will be described in detail later.

The CSMA/CA unit 21006 has a CSMA/CA function. The CSMA/CA unit 21006 determines, according to carries sense using the information regarding the interference level as generated by the receiving unit 21004, whether the base station apparatus 2101 is allowed or disallowed to perform a transmission, and generates transmission allow/disallow determination information. Since the wireless communication system according to the present embodiment assumes channel aggregation, the CSMA/CA unit 21006 executes carrier sense on a plurality of channels, perform transmission allow/disallow determination for each channel, and notifies the transmitting unit 22002 of transmission allow/disallow information for each separate channel.

Figure 12:
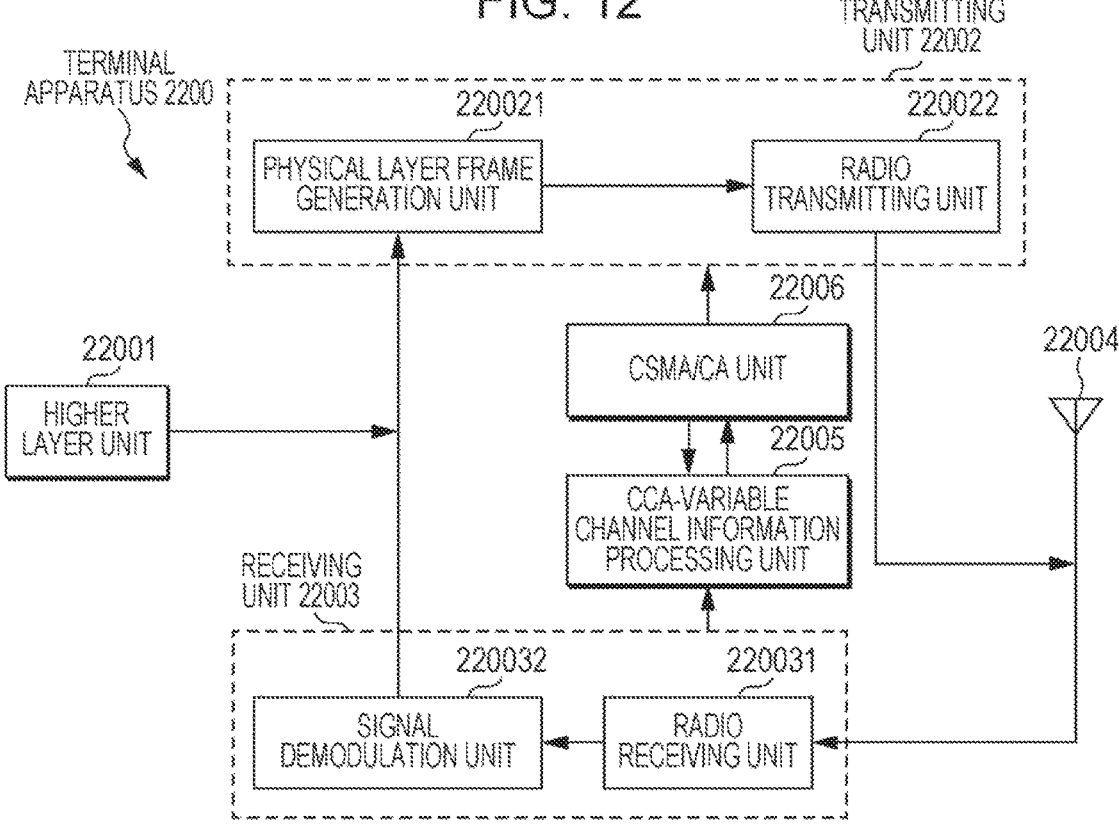
FIG. 12 is a diagram showing an example of an apparatus configuration of a terminal apparatus 2200 according to the present embodiment.

FIG. 12 is a diagram showing an example of an apparatus configuration of each of the terminal apparatuses 2200 according to the present embodiment. The terminal apparatus 2200 includes a higher layer unit 22001, a transmitting unit 22002, a receiving unit 22003, an antenna unit 22004, a CCA-variable channel information processing unit 22005, and a CSMA/CA unit 22006.

The higher layer unit 22001, the transmitting unit 22002, the receiving unit 22003, and the antenna unit 22004 are identical in operation to the higher layer unit 2001, the transmitting unit 2002, the receiving unit 2003, and the antenna unit 2004 according to the first embodiment, respectively.

The transmitting unit 22002 includes a physical layer frame generation unit 220021 and a radio transmitting unit 220022, which are identical in operation to the physical layer frame generation unit 20021 and the radio transmitting unit 20022 according to the first embodiment, respectively.

The receiving unit 22003 includes a radio receiving unit 220031 and a signal demodulation unit 220032, which are identical in operation to the radio receiving unit 20031 and the signal demodulation unit 20032 according to the first embodiment, respectively.

The CCA-variable channel information processing unit 22005 acquires first CCA-variable channel instruction information, first CCA-variable offset information, or both notified from the base station apparatus 2101 and determines a CCA-variable channel. The CCA-variable channel information processing unit 22005 notifies the CSMA/CA unit 22006 of information regarding a CCA-variable channel of each of the primary and secondary channels in the BSS 2301 to which the terminal apparatus 2200 belongs and information regarding a CCA-variable offset.

The CSMA/CA unit 22006 has a CSMA/CA function. The CSMA/CA unit 22006 determines the carrier sense level of each of the channels according to the information regarding the CCA-variable channel and the information regarding the CCA-variable offset notified by the CCA-variable channel information processing unit 22005. The terminal apparatus 2200 according to the present embodiment simultaneously performs carrier sense on a plurality of channels with different carrier sense levels.

Each of the terminal apparatuses 2200a has the same apparatus configuration as the terminal apparatus 2200 but differs from the terminal apparatus 2200 in that the terminal apparatus 2200a does not have a function related to the CCA-variable channel information processing unit 22005.

Under the IEEE 802.11 standards, dynamic bandwidth operation (hereinafter also referred to as "DBO") is defined as a function for enhancing the certainty of bandwidth reservation by channel aggregation.

Figure 13:
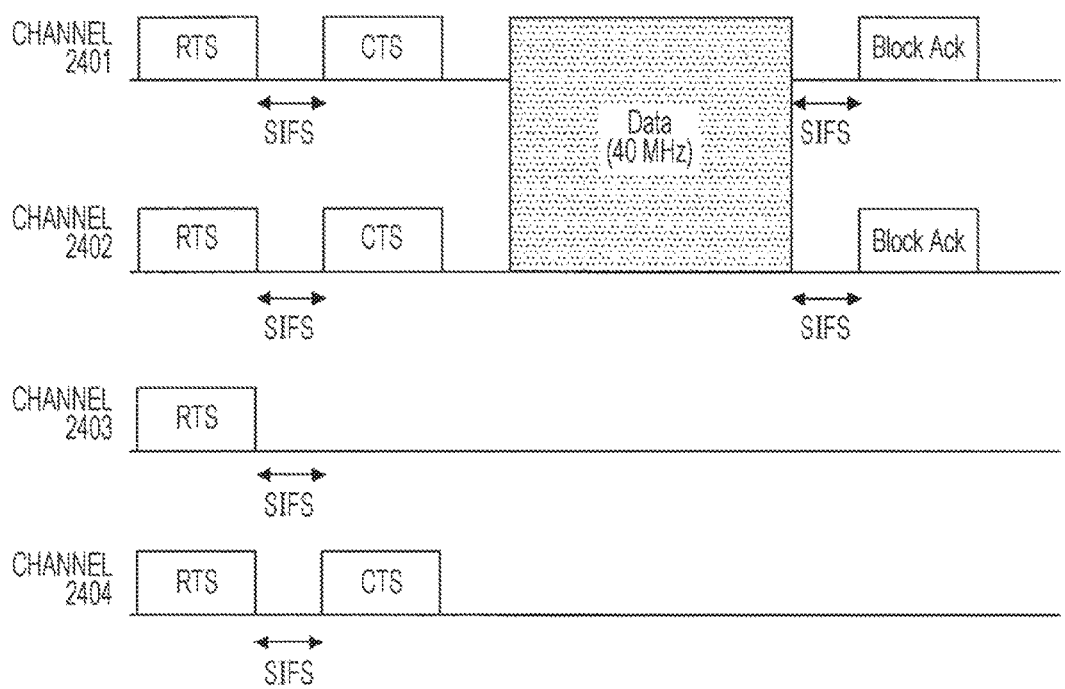
FIG. 13 is a diagram schematically showing an example of a DBO procedure.

FIG. 13 is a diagram schematically showing an example of a DBO procedure. According to FIG. 13, a terminal apparatus 2200 trying to transmit data to the base station apparatus 2101 through the channels 2400 transmits an RTS through all of the channels 2400. The base station apparatus 2101, which is a receiving station, performs carrier sense on each of the channels 2400 and transmits a CTS to the terminal apparatus 2200 only through any of the channels 2400 that are idle. If the base station apparatus 2101 determines that all of the channels are idle and transmits a CTS through all of the channels 2400, the terminal apparatus 2200 can transmit data through all of the channels 2400.

However, as shown in FIG. 13, in a case where the base station apparatus 2101 determines that the channel 2403 is busy, the base station apparatus 2101 does not transmit a CTS through the channel 2403. Accordingly, the terminal apparatus 2200 determines that only the channels 2401, 2402, and 2404 are available channels. Under the existing IEEE 802.11 standards, which cannot transmit data through non-contiguous channels with some exceptions, it is usual for the terminal apparatus 2200 to perform an operation of transmitting data through the channels 2401 and 2402. Note, however, that the terminal apparatuses 2200 and the base station apparatus 2101 according to the present embodiment may transmit data through non-contiguous channels.

In a case where the base station apparatus 2101 transmits data to a terminal apparatus 2200, too, it is possible to apply the DBO operation shown in FIG. 13. At this time, the base station apparatus 2101 may incorporate first CCA-variable channel instruction information, first CCA-variable offset information, or both into an RTS or a signal (such as a management frame or an action frame) having an RTS-associated function. The terminal apparatus 2200 may determine a carrier sense level from the first CCA-variable channel instruction information and/or the first CCA-variable offset information of the RTS received or the signal having the RTS-associated function.

The CCA-variable channel determination unit 21002 determines a CCA-variable channel and CCA-variable offset information. The following shows, an example, a mechanism that protects the terminal apparatuses 2200a, which are legacy terminal apparatuses.

The primary channel 2401 and the secondary channels 2402 and 2403 are available to the base station apparatus 2101. The base station apparatus 2101 transmits a broadcast signal such as a beacon frame through the primary channel 2401. For that purpose, the terminal apparatuses 2200 and the terminal apparatuses 2200a are connected to the base station apparatus 2101 through the primary channel 2401. Further, the terminal apparatuses 2200 and the base station apparatus 2101 can achieve data transmissions on a wider band through channel aggregation of the primary channel 2401 and the secondary channels 2402 to 2404.

However, the terminal apparatuses 2200a can only transmit data through the primary channel 2401. For that reason, for the purpose of protecting the terminal apparatuses 2200a, it is desirable that the CCA level of the primary channel 2401 be rendered unchangeable or configured to be lower than the CCA levels of the secondary channels 2402 to 2404. That is, the base station apparatus 2101 configure the first CCA-variable channel instruction information and the first CCA-variable offset information so as to configure the CCA levels of the secondary channels 2402 to 2404 to be high and configure the CCA level of the primary channel 2401 to be low.

Figure 21:
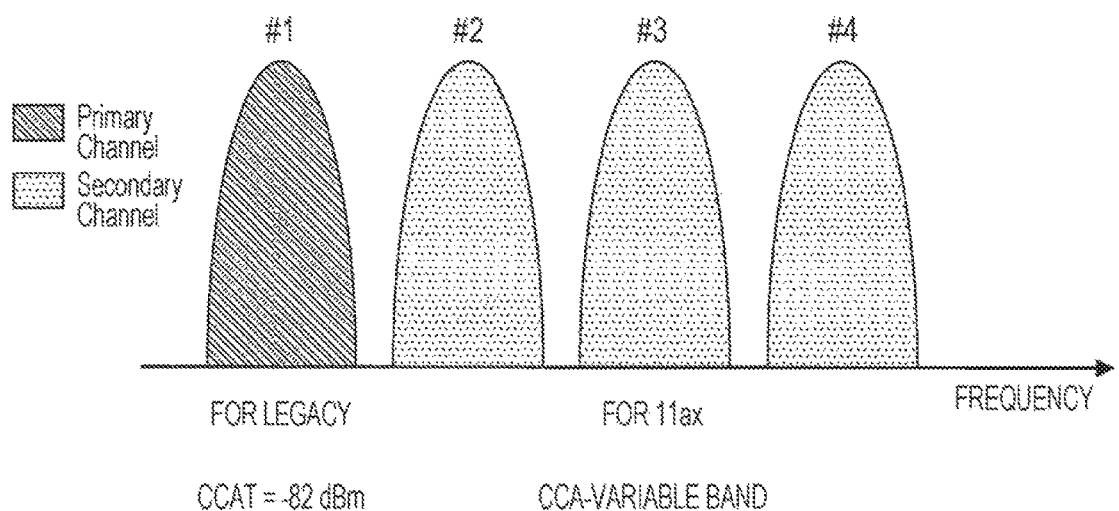
FIG. 21 is a diagram showing examples of channels in a case where channel aggregation is used.

For example, as shown in FIG. 21, the primary channel #1 is assigned to a legacy terminal apparatus and the CCA level is configured to be low (−82 dBm). Further, the secondary channels #2 to #4 are assigned to IEEE 802.11ax-compliant terminal apparatuses, and the CCA levels are configured to be higher than that of the primary channel and rendered variable. Such a configuration ensures fairness between the terminal apparatuses 2200 and the terminal apparatuses 2200a in the acquisition of transmission opportunities of the primary channel 2401 in FIG. 8, making it possible to avoid deterioration in throughput of the terminal apparatuses 2200a, which are legacy terminal apparatuses.

It should be noted that the present embodiment is not limited to this operation. The base station apparatus 2101 may configure the primary channel 2401 to be a CCA-variable channel or may configure the CCA level of the primary channel 2401 to be lower than the CCA levels of the secondary channels 2402 to 2404.

The base station apparatus 101 can notify the terminal apparatuses 200 of second CCA-variable channel instruction information for giving an instruction to initialize the configuration of carrier sense on the subchannels 400 managed by the BSS 301 (such as configuring the CCA level to be unchangeable or changing the CCA level back to the default).

For example, in a case where the base station apparatus 2101 regularly notifies the terminal apparatuses 2200 of the first CCA-variable channel instruction information, the first CCA-variable offset information, or both through beacon signals or the like, the base station apparatus 2101 can terminate the regular notification of the first CCA-variable channel instruction information, the first CCA-variable offset information, or both by notifying the terminal apparatuses 2200 of the second CCA-variable channel instruction information. The terminal apparatuses 2200 can immediately change the CCA level back to the default in accordance with the second CCA-variable channel instruction information notified by the base station apparatus 2101.

Third Embodiment

A wireless communication system according to the present embodiment is premised on an OFDMA scheme. OFDMA is a scheme for achieving multiple access by dividing a single channel into a plurality of subchannels and assigning the channels to a plurality of users. The OFDMA according to the present embodiment can be broadly classified as either of two methods of OFDMA. A first method of OFDMA is a method by which a single 20-MHz channel (under the IEEE 802.11 standards, a 20-MHz channel serves as a reference) is divided into a plurality of subchannels and the subchannels are assigned to a plurality of users. The division of a single 20-MHz channel into a plurality of subchannels is expected to bring about a multi-user diversity effect that is peculiar to OFDMA. Another method of OFDMA is a method by which a plurality of 20-MHz channels are assigned to a plurality of users. In this case, since a single 20-MHz channel is assigned to each user, the MUD effect is not expected. However, a reduction in overhead by the simultaneous assignment of a plurality of users to communication, an improvement in channel utilization efficiency by the use of non-contiguous channels, and the like are expected.

It should be noted that, in the following, a 20-MHz channel that is assigned to each user is referred to as "subchannel" even in a case where a plurality of 20-MHz channels are assigned to a plurality of users.

Figure 14:
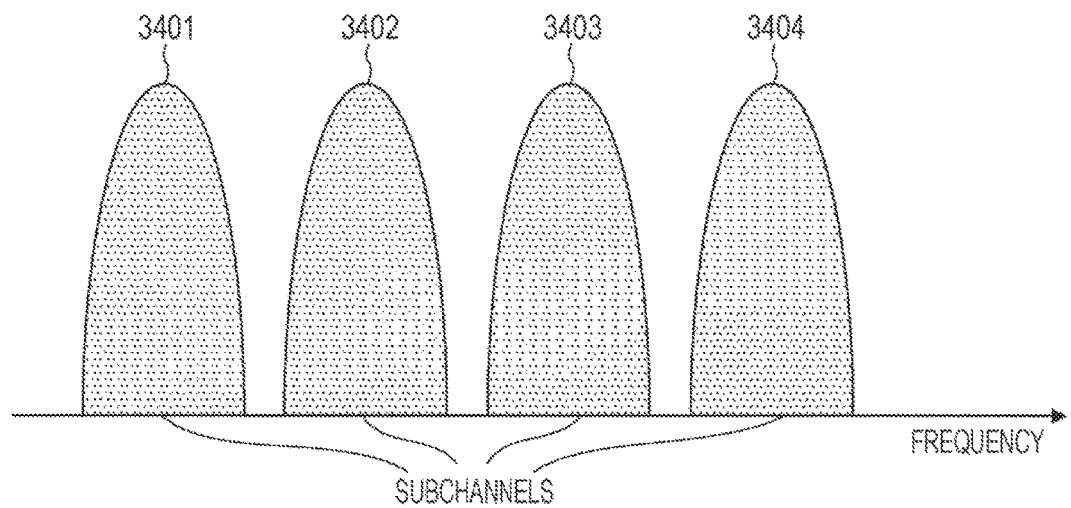
FIG. 14 is a diagram showing examples of channels that are available in OFDMA.

FIG. 14 is a diagram showing examples of channels that are available in OFDMA. Under an OFDMA scheme, the subchannels 3401 to 3404 are assigned to a plurality of users. The subchannels 3401 to 3404 are also referred to as "subchannels 3400".

Figure 15:
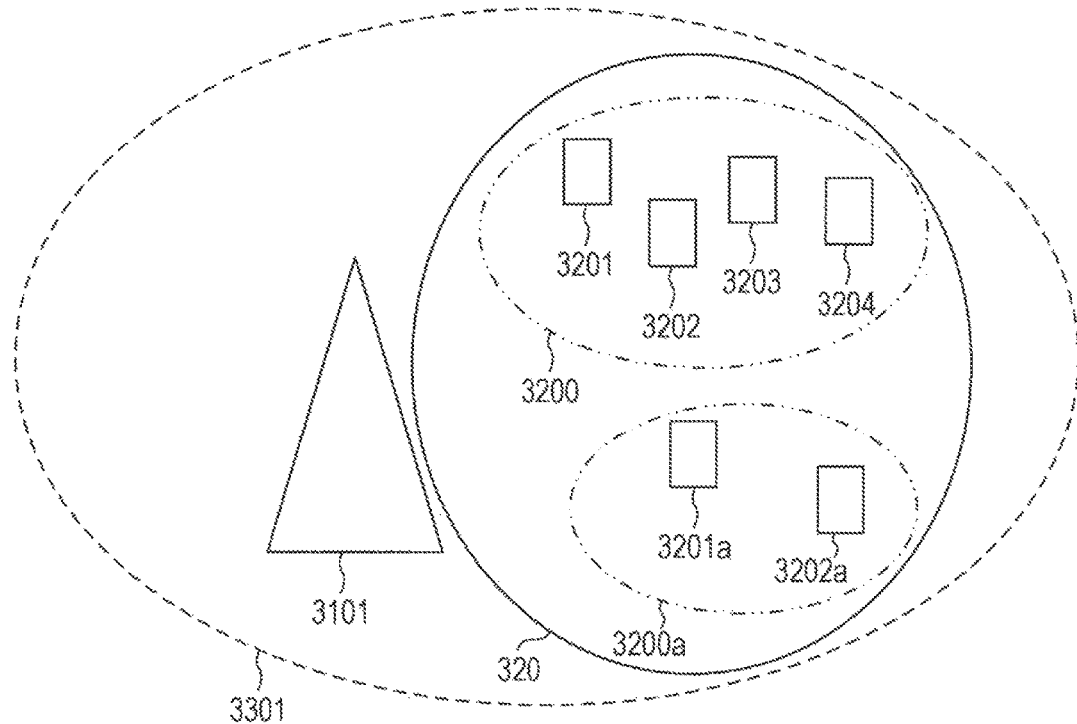
FIG. 15 is a diagram schematically showing a wireless communication system according to the present embodiment.

FIG. 15 is a diagram schematically showing the wireless communication system according to the present embodiment. A base station apparatus 3101, terminal apparatuses 3201 to 3204, terminal apparatuses 3201a and 3202a constitute a BSS 3301. In the following, the terminal apparatuses 3201 to 3204 are also referred to as "terminal apparatuses 3200", and the terminal apparatuses 3201a and 3202a are also referred to as "terminal apparatuses 3200a". Further, the terminal apparatuses 3200 and the terminal apparatuses 3200a are also collectively referred to as "terminal apparatuses 320". The base station apparatus 3101 and the terminal apparatuses 320 according to the present embodiment are identical in operation to the base station apparatus 101 and the terminal apparatuses 20 according to the first embodiment, respectively. Note, however, that the terminal apparatuses 3200 according to the present embodiment are terminal apparatuses that are capable of changing the CCA level and have an OFDMA function. The OFDMA function will be described later. It should be noted that, as with the terminal apparatuses 200a according to the first embodiment, the terminal apparatuses 3200a according to the present embodiment include terminal apparatuses that are compliant with the LTE standard.

It should be noted that the BSS 3301 according to the present embodiment may be constituted solely by the base station apparatus 3101 and the terminal apparatuses 3200. In this case, too, the present invention can be carried out in the same manner as in the case where the BSS 3301 is constituted by the base station apparatus 3101, the terminal apparatuses 3200, and the terminal apparatuses 3200a.

The base station apparatus 3101 has a DL-OFDMA (downlink OFDMA) function of simultaneously executing data transmissions to the plurality of terminal apparatuses 3200 at a given time. The base station apparatus 3101 is capable of multiplex transmission based on the orthogonality frequency resources by assigning a plurality of subchannels to different terminal apparatuses 3200, respectively. For example, the base station apparatus 3101 can assign the subchannel 3401 to the terminal apparatuses 3201, assign the subchannel 3402 to the terminal apparatuses 3202, assign the subchannel 3403 to the terminal apparatuses 3203, and assign the subchannel 3404 to the terminal apparatuses 3204. Alternatively, the base station apparatus 3101 can assign different numbers of subchannels to each separate terminal apparatus 3200. For example, the base station apparatus 3101 can assign the subchannel 3401 and 3402 to the terminal apparatus 3201, assign the subchannel 3403 to the terminal apparatus 3202, and assign the subchannel 3404 to the terminal apparatus 3203.

The terminal apparatuses 3200 have an UL-OFDMA (uplink OFDMA) function for the plurality of terminal apparatuses 3200 to simultaneously perform data transmissions through different channels 3400 at a given time. The base station apparatus 3101, which receives UL-OFDMA signals, simultaneously receives data frames from the plurality of terminal apparatuses 3200.

The following first gives description of an operation according to the present embodiment on the premise of an UL-OFDMA operation and then gives a description premised on a DL-OFDMA operation.

Figure 16:
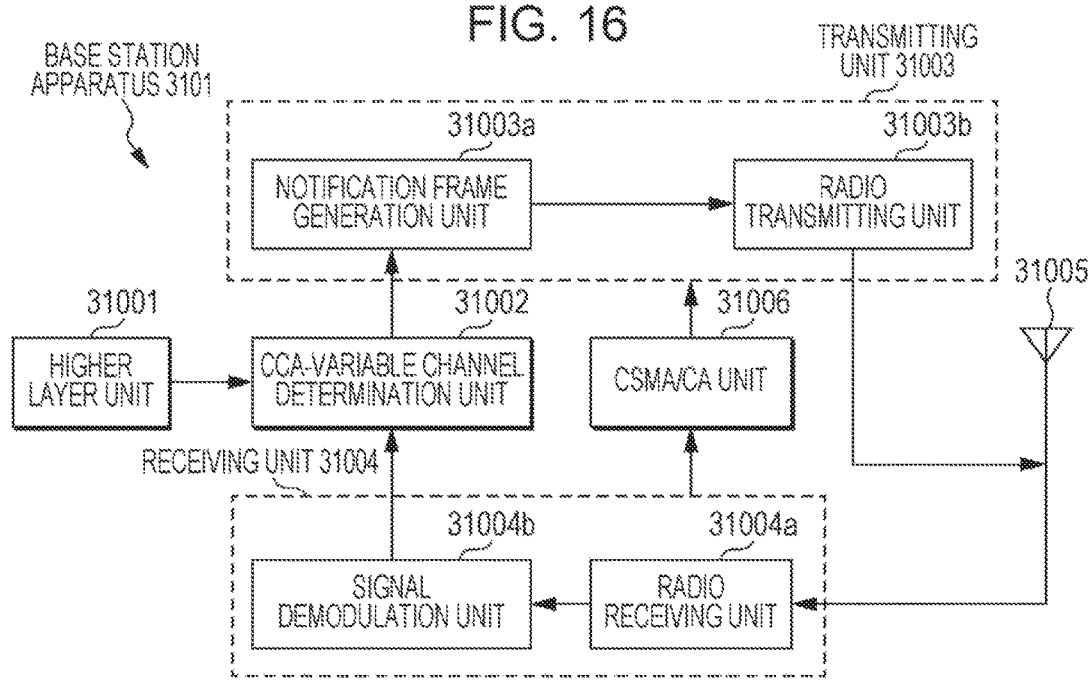
FIG. 16 is a diagram showing an example of an apparatus configuration of a base station apparatus 3101 according to the present embodiment.

FIG. 16 is a diagram showing an example of an apparatus configuration of the base station apparatus 3101 according to the present embodiment. The base station apparatus 3101 includes a higher layer unit 31001, a CCA-variable channel determination unit 31002, a transmitting unit 31003, a receiving unit 31004, an antenna unit 31005, and a CSMA/CA unit 31006.

The higher layer unit 31001, the CCA-variable channel determination unit 31002, the transmitting unit 31003, the receiving unit 31004, and the antenna unit 31005 have the same functions as the higher layer unit 21001, the CCA-variable channel determination unit 21002, the transmitting unit 21003, the receiving unit 21004, and the antenna unit 21005 according to the second embodiment, respectively.

Furthermore, the transmitting unit 31003 includes a notification frame generation unit 31003a and a radio transmitting unit 31003b, which have the same functions as the notification frame generation unit 21003a and the radio transmitting unit 21003b according to the second embodiment, respectively.

Furthermore, the receiving unit 31004 includes a radio receiving unit 31004a and a signal demodulation unit 31004b, which have the same functions as the radio receiving unit 21004a and the signal demodulation unit 21004b according to the second embodiment, respectively.

The CSMA/CA unit 31006 has a CSMA/CA function. The CSMA/CA unit 31006 performs carrier sense on the basis of information regarding an interference level as generated by the receiving unit 31004. Further, the CSMA/CA unit 31006 has a user scheduling function for UL-OFDMA. For example, the CSMA/CA unit 31006 can select a terminal apparatus 3200 with the highest reception quality (such as the highest reception power, the lowest interference level, the highest ratio of reception of Ack responses, or the highest throughput) for each separate subchannel.

The base station apparatus 3101 can notify a terminal apparatus 3200 of information regarding user assignment for each separate subchannel (user assignment information) through a notification frame generated by the notification frame generation unit 31003a (e.g. in an information item of a beacon signal or in the MAC header or PHY header of the notification frame).

Figure 17:
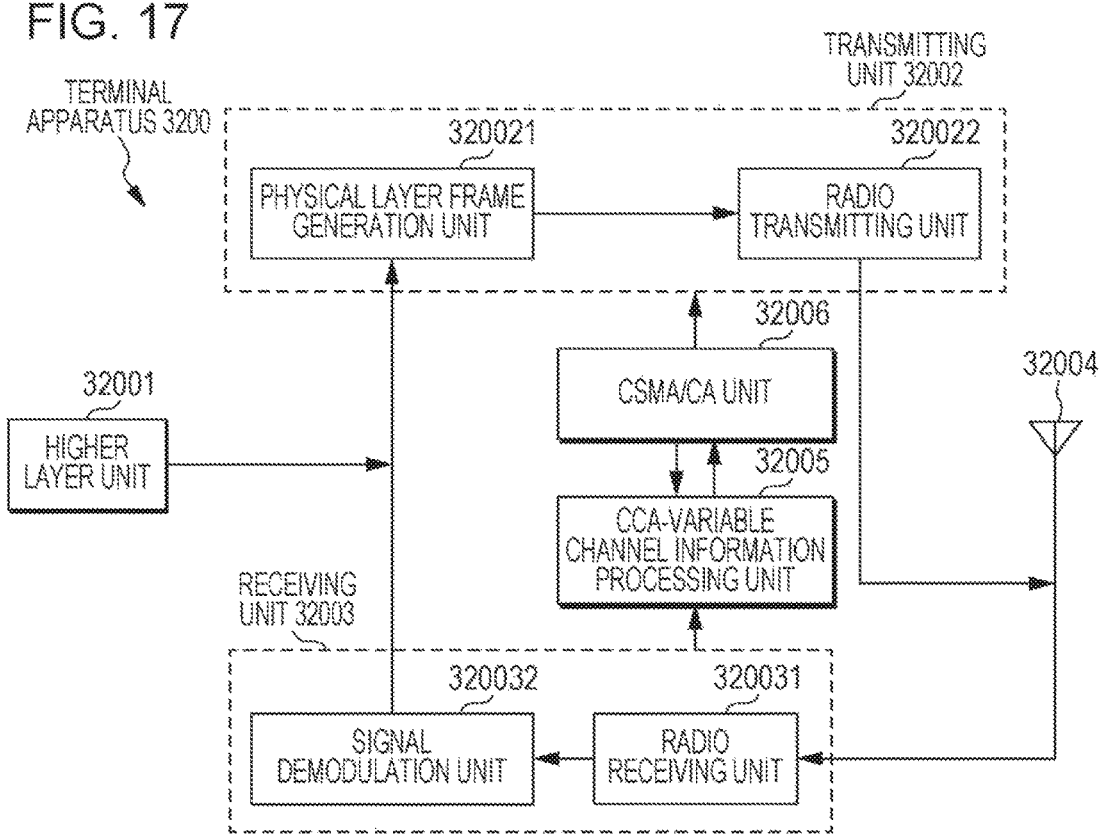
FIG. 17 is a diagram showing an example of an apparatus configuration of a terminal apparatus 3200 according to the present embodiment.

FIG. 17 is a diagram showing an example of an apparatus configuration of each of the terminal apparatuses 3200 according to the present embodiment. The terminal apparatus 3200 includes a higher layer unit 32001, a transmitting unit 32002, a receiving unit 32003, an antenna unit 32004, a CCA-variable channel information processing unit 32005, and a CSMA/CA unit 32006.

The higher layer unit 32001, the transmitting unit 32002, the receiving unit 32003, and the antenna unit 32004 are identical in operation to the higher layer unit 2001, the transmitting unit 2002, the receiving unit 2003, and the antenna unit 2004 according to the first embodiment, respectively.

The transmitting unit 32002 includes a physical layer frame generation unit 320021 and a radio transmitting unit 320022, which are identical in operation to the physical layer frame generation unit 20021 and the radio transmitting unit 20022 according to the first embodiment, respectively.

The receiving unit 32003 includes a radio receiving unit 320031 and a signal demodulation unit 320032, which are identical in operation to the radio receiving unit 20031 and the signal demodulation unit 20032 according to the first embodiment, respectively.

The CCA-variable channel information processing unit 32005 acquires first CCA-variable channel instruction information, first CCA-variable offset information, or both notified from the base station apparatus 3101 and determines a CCA-variable channel. The CCA-variable channel information processing unit 32005 acquires user assignment information notified by the base station apparatus 3101 and, in UL-OFDMA, prepares for a transmission through a subchannel that the terminal apparatus is assigned.

The CSMA/CA unit 32006 has a CSMA/CA function. The CSMA/CA unit 32006 determines the carrier sense level of each of the channels according to the information regarding the CCA-variable channel and the information regarding the CCA-variable offset notified by the CCA-variable channel information processing unit 32005. The terminal apparatus 3200 according to the present embodiment can simultaneously perform carrier sense on a plurality of channels with different carrier sense levels and may select, according to the user assignment information notified by the base station apparatus 3101, a subchannel on which to execute carrier sense.

Each of the terminal apparatuses 3200a has the same apparatus configuration as the terminal apparatus 3200 but differs from the terminal apparatus 3200 in that the terminal apparatus 3200a does not have a function related to the CCA-variable channel information processing unit 32005.

Figure 18:
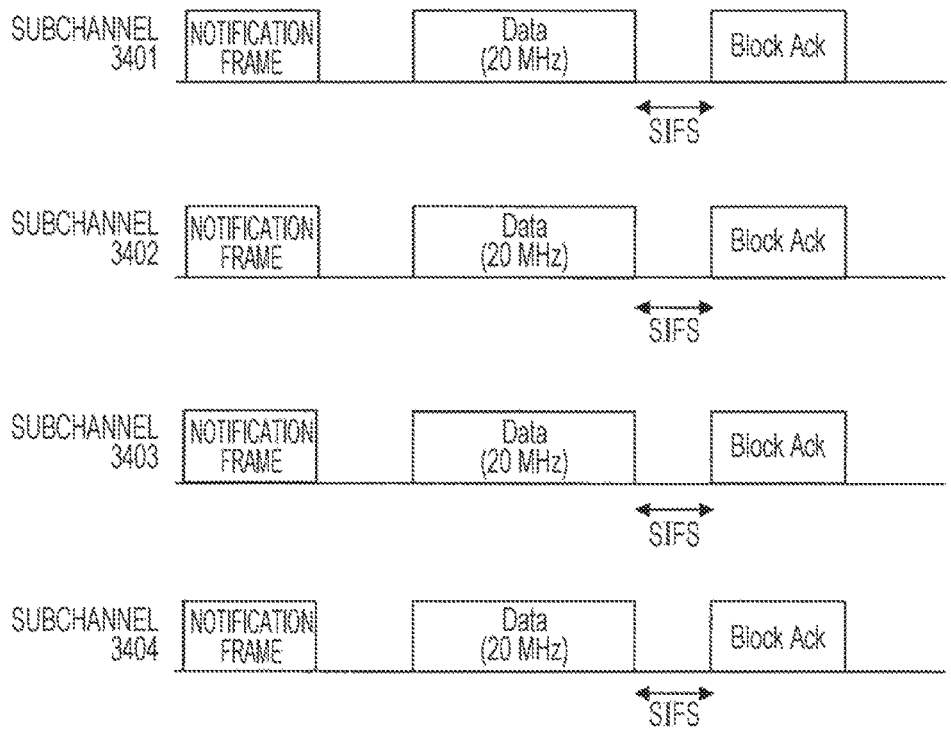
FIG. 18 is a diagram showing an example of an embodiment of UL-OFDMA.

FIG. 18 is a diagram showing an example of an embodiment of UL-OFDMA. The base station apparatus 3101 transmits a notification frame on a subchannel that is used for UL-OFDMA. The notification frame contains user assignment information, and the terminal apparatus 3200 recognizes, with reference to the user assignment information, a subchannel that the terminal apparatus is assigned.

The terminal apparatus 3200 assigned a subchannel by the base station apparatus 3101 prepares for a data transmission. In UL-OFDMA, it is necessary that the plurality of terminal apparatuses 3200 be synchronized and perform simultaneous transmission. For example, the base station apparatus 3101 may transmit a synchronizing frame to the terminal apparatus 3201 and may use a notification frame as the synchronizing frame. For example, the base station apparatus 3101 allows the terminal apparatuses 3200 simultaneous transmission by configuring the terminal apparatuses 3200 to start data transmissions after a specified waiting time (e.g. an SIFS, a PIFS, a DIFS, or the like) has elapsed since notification frame reception.

Upon receiving UL-OFDMA signals simultaneously transmitted by the terminal apparatuses 3200, the base station apparatus 3101 waits for the duration of an SIFS period and then transmits Block ACk (or Ack) as an acknowledge response thereto.

In UL-OFDMA, the base station apparatus 3101 can notify each of the terminal apparatuses 3200 of first CCA-variable channel instruction information, first CCA-variable offset information, or both. For example, if the channel that the terminal apparatuses 3200a, which are legacy terminal apparatuses, use is the subchannel 3401 (or overlaps the subchannel 3401), it is possible to protect transmission opportunities for the legacy terminals 3200a by configuring the CCA level of the subchannel 3401 to be unchangeable or configuring the CCA level of the subchannel 3401 to be lower than CCA levels that are configured on the subchannels 3402 to 3404.

It should be noted that the present embodiment is not limited to this operation. The base station apparatus 3101 may configure the subchannel 3401 to be a CCA-variable channel or may configure the CCA level of the subchannel 3401 to be lower than the CCA levels of the subchannels 3402 to 3404.

The following gives a description premised on a DL-OFDMA operation. In a DL-OFDMA system, the base station apparatus 3101 is capable of simultaneous transmission to the plurality of terminal apparatuses 3200 through the plurality of subchannels 3400.

The notification frame generation unit 31003a, which is one of the constituent elements of the base station apparatus 3101, can generate a physical layer frame from a data frame addressed to a terminal apparatus 320.

The base station apparatus 3101 can generate an OFDMA signal from a physical layer frame addressed to a plurality of terminal apparatuses 3200. Further, the base station apparatus 3101 can generate an OFDMA signal from a physical layer frame addressed to a single terminal apparatus 320 and may generate a signal under a scheme other than OFDM (e.g. CDM (code division multiplex), DSSS (direct sequence spread spectrum), or the like). It should be noted that the base station apparatus 3101 can also generate a DL-MU-MIMO/OFDMA signal from a physical layer frame addressed to a plurality of terminal apparatuses 3200.

Figure 19:
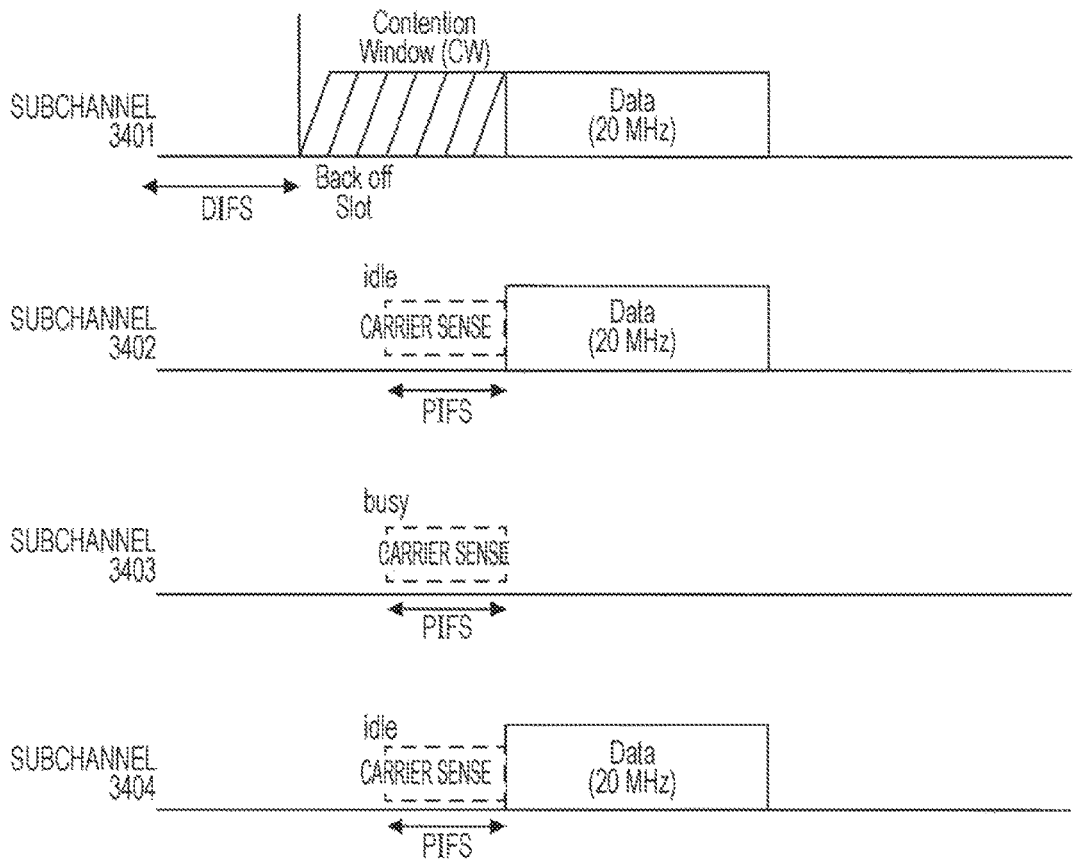
FIG. 19 is a schematic view showing an example of an access mechanism at the time of OFDMA transmission.

FIG. 19 is a schematic view showing an example of an access mechanism at the time of OFDMA transmission. FIG.

19 shows an example of a case where data is transmitted to four terminal apparatuses 3200. Note, however, that the access mechanism shown in FIG. 19 is not intended to limit the present embodiment and a method other than the access mechanism shown in FIG. 19 may be applied. For example, the base station apparatus 3101 waits for a DIFS period before transmission through the subchannel 3401 and then waits for the duration of random back off before transmission. The base station apparatus 3101 performs carrier sense on the subchannels 3402 to 3404 for the duration of a PIFS period immediately before the end of the random back off. The base station apparatus 3101 can generate an OFDMA signal on subchannels 3400 determined to be idle and transmit the OFDMA signal to the terminal apparatus 3200. As shown in FIG. 19, the OFDMA signal may span non-contiguous subchannels.

Those terminal apparatuses 3200 which have received the OFDMA signal may or may not return Ack to the base station apparatus 3101.

Figure 20:
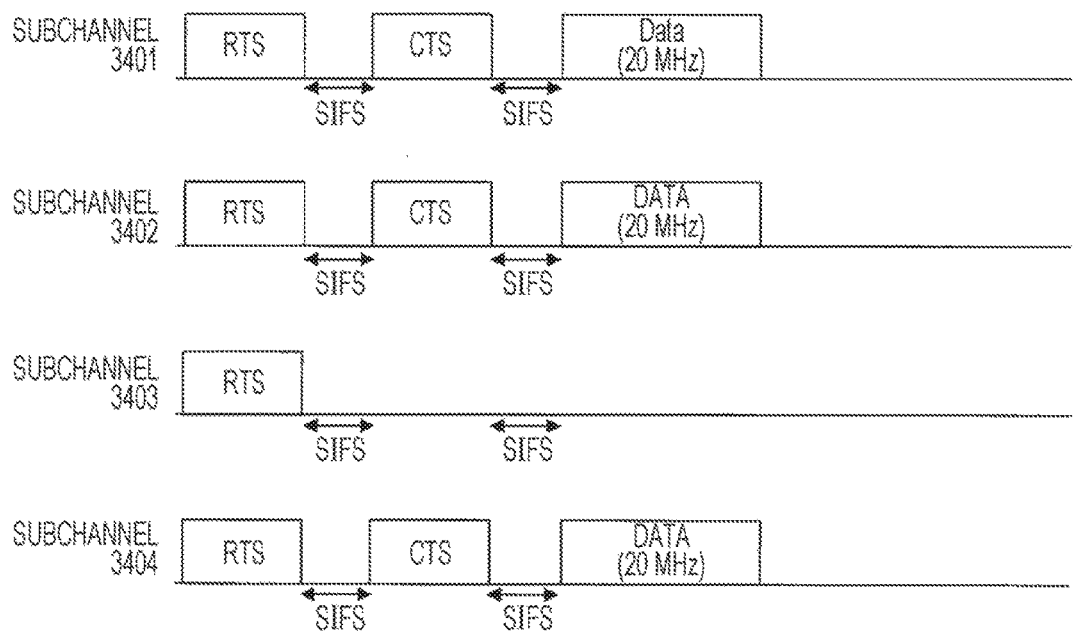
FIG. 20 is a schematic view showing an example of an access mechanism at the time of OFDMA transmission based on DBO.

FIG. 20 is a schematic view showing an example of an access mechanism at the time of OFDMA transmission based on DBO. FIG. 20 shows an example of a case where data is transmitted to four terminal apparatuses 3200. Note, however, that the access mechanism shown in FIG. 20 is not intended to limit the present embodiment and a method other than the access mechanism shown in FIG. 20 may be applied.

For example, the base station apparatus 3101 transmits an RTS through each of the subchannels 3400. Alternatively, the base station apparatus 3101 transmits a signal for instructing the terminal apparatuses 3200 to execute carrier sense on the subchannels. The terminal apparatuses receive the RTS, wait for the duration of an SIFS period before transmission, and perform carrier sense. In a case of having determined that the subchannels are idle, the terminal apparatuses 3200 transmit CTSs to the base station apparatus 3101 as a response to the RTS.

The base station apparatus 3101 can generate an OFDMA signal through only the subchannels through which the base station apparatus 3101 received the CTSs and transmit the OFDMA signal to the terminal apparatuses 3200.

Those terminal apparatus 3200 which have received the OFDMA signal may or may not return Ack to the base station apparatus 3101.

In DL-OFDMA, the base station apparatus 3101 can notify the terminal apparatuses 3200 of first CCA-variable channel instruction information, first CCA-variable offset information, or both.

The terminal apparatuses 3200 can change channels in accordance with the first CCA-variable channel instruction information and can also change, in accordance with the first CCA-variable channel instruction information and the first CCA-variable offset information, CCA levels at which carrier sense is executed.

Further, the base station apparatus 3101 can perform carrier sense in accordance with the first CCA-variable channel instruction information, the first CCA-variable offset information, or both.

For example, if the channel that the terminal apparatuses 3200a, which are legacy terminal apparatuses, use is the subchannel 3401 (or overlaps the subchannel 3401), it is possible to protect transmission opportunities for the legacy terminals 3200a by configuring the CCA level of the subchannel 3401 to be unchangeable or configuring the CCA level of the subchannel 3401 to be lower than CCA levels that are configured on the subchannels 3402 to 3404.

It should be noted that the present embodiment is not limited to this operation. The base station apparatus 3101 may configure the subchannel 3401 to be a CCA-variable channel or may configure the CCA level of the subchannel 3401 to be lower than the CCA levels of the subchannels 3402 to 3404.

The base station apparatus 3101 can notify the terminal apparatuses 3200 of second CCA-variable channel instruction information for giving an instruction to initialize the configuration of carrier sense on the subchannels 3400 managed by the BSS 3301 (such as configuring the CCA level to be unchangeable or changing the CCA level back to the default).

For example, in a case where the base station apparatus 3101 regularly notifies the terminal apparatuses 3200 of the first CCA-variable channel instruction information, the first CCA-variable offset information, or both through beacon signals or the like, the base station apparatus 3101 can terminate the regular notification of the first CCA-variable channel instruction information, the first CCA-variable offset information, or both by notifying the terminal apparatuses 3200 of the second CCA-variable channel instruction information. The terminal apparatuses 3200 can immediately change the CCA level back to the default in accordance with the second CCA-variable channel instruction information notified by the base station apparatus 3101.

(A) It should be noted that the present invention may assume the following aspects: A terminal apparatus according to the present invention is a terminal apparatus that is applied to a communication system which controls transmission opportunities through carrier sense and that performs wireless communication with a base station apparatus, including: a CCA-variable channel information processing unit that, according to first CCA (clear channel assessment) variable channel instruction information acquired from the base station apparatus, gives an instruction to switch to a channel whose CCA level is able to be changed; and a CSMA/CA unit that selects, according to the instruction, a channel on which to perform carrier sense.

(B) Further, the terminal apparatus according to the present invention characterized in that the CCA-variable channel information processing unit notifies the CSMA/CA unit of first CCA-variable offset information acquired from the base station apparatus.

(C) Further, the terminal apparatus according to the present invention is characterized in initializing a configuration of carrier sense according to second CCA-variable channel instruction information acquired from the base station apparatus.

(D) Further, a base station apparatus according to the present invention is a base station apparatus that is applied to a communication system which controls transmission opportunities through carrier sense and that performs wireless communication with a terminal apparatus, including: a CCA-variable channel determination unit that generates first CCA-variable channel instruction information that is used to instruct the terminal apparatus to switch to a channel whose CCA (clear channel assessment) level is able to be changed; a notification frame generation unit that generates a notification frame for notifying the terminal apparatus of the first CCA-variable channel instruction information thus generated; and a radio unit that transmits a notification frame containing the first CCA-variable channel instruction information to the terminal apparatus.

(E) Further, the base station apparatus according to the present invention is characterized in that the CCA-variable channel determination unit generates first CCA-variable offset information for restricting a variable range of a CCA level for the terminal apparatus.

(F) Further, a terminal apparatus according to the present invention is a terminal apparatus that is applied to a communication system which controls transmission opportunities through carrier sense and that performs communication with a base station apparatus through a plurality of channels, including: a CCA-variable channel information processing unit that acquires first CCA-variable channel instruction information and gives an instruction to switch to a channel whose CCA level is able to be changed; and a CSMA/CA unit that selects, according to the instruction from the CCA-variable channel information processing unit, a channel on which to perform carrier sense.

(G) Further, the terminal apparatus according to the present invention is characterized in that the CCA-variable channel information processing unit acquires first CCA-variable offset information and notifies the CSMA/CA unit of information regarding a CCA-variable range.

(H) Further, the terminal apparatus according to the present invention is characterized in that the terminal apparatus acquires second CCA-variable channel instruction information and initializes a configuration of carrier sense.

(I) Further, a base station apparatus according to the present invention is a base station apparatus that is applied to a communication system which controls transmission opportunities through carrier sense and that performs wireless communication, including: a CCA-variable channel determination unit that generates the first CCA-variable channel instruction information; a notification frame generation unit that generates a notification frame that notifies the terminal apparatus of the first CCA-variable channel instruction information; a radio transmitting unit that converts the notification frame into a radio-frequency signal; and antenna unit that sends out the radio-frequency signal into wireless space.

(J) Further, the base station apparatus according to the present invention is characterized in that the CCA-variable channel determination unit generates the first CCA-variable offset information.

(K) Further, the base station apparatus according to the present invention is characterized in that the CCA-variable channel instruction information determination unit uses different pieces of the first CCA-variable offset information for a plurality of the terminal apparatuses.

(L) Further, the base station apparatus according to the present invention is characterized in that the CCA-variable channel determination unit generates second CCA-variable channel instruction information.

(M) Further, a channel switching method according to the present invention is a channel switching method for, in a communication system that controls transmission opportunities through carrier sense, switching channels according to information of which the base station apparatus notifies the terminal apparatus regarding a channel whose CCA level is able to be changed, including: a step in which the base station apparatus generates the first CCA-variable channel instruction information; a step in which the base station apparatus notifies the terminal apparatus of the first CCA-variable channel instruction information; and a step in which the terminal apparatus switches to a CCA-variable channel in accordance with the first CCA-variable channel instruction information.

As described above, according to the present embodiment, the instruction to switch to a channel whose CCA level can be changed is given according to the first CCA-variable channel instruction information acquired from the base station apparatus, and the channel on which to perform carrier sense is selected according to the instruction. This allows each terminal apparatus to use separate radio resources, whereby the occurrence of decreases in communication opportunities for terminal apparatuses is avoided. This makes it possible to significantly increase throughput per terminal apparatus.

The present disclosure contains subject matter related to that disclosed in Japanese Priority Patent Application JP 2015-012831 filed in the Japan Patent Office on Jan. 26, 2015, the entire contents of which are hereby incorporated by reference.

REFERENCE SIGNS LIST

101 Base station apparatus (base station)
200 Terminal apparatus
200a Terminal apparatus
220 Terminal apparatus
320 Terminal apparatus
1001 Higher layer unit
1002 CCA-variable channel determination unit
1003 Transmitting unit
1003a Notification frame generation unit
1003b Radio transmitting unit
1004 Receiving unit
1004a Radio receiving unit
1004b Signal demodulation unit
1005 Antenna unit
1006 CSM/CA unit
2001 Higher layer unit
2001a Higher layer unit
2002 Transmitting unit
2002a Transmitting unit
2003 Receiving unit
2003a Receiving unit
2004 Antenna unit
2004a Antenna unit
2005 CCA-variable channel information processing unit
2005a CSMA/CA unit
2006 CSMA/CA unit
2101 Base station apparatus
2200 Terminal apparatus
2200a Terminal apparatus
3101 Base station apparatus
3200 Terminal apparatus
3200a
Terminal apparatus (legacy terminal)
3201 Terminal apparatus
3202 Terminal apparatus
3203 Terminal apparatus
3204 Terminal apparatus
20021 Physical layer frame generation unit
20021a Physical layer frame generation unit
20022 Radio transmitting unit
20022a Radio transmitting unit
20031 Radio receiving unit
20031a Radio receiving unit
20032 Signal demodulation unit
20032a Signal demodulation unit
21001 Higher layer unit
21002 CCA-variable channel determination unit
21003 Transmitting unit
21003a Notification frame generation unit
21003b Radio transmitting unit
21004 Receiving unit
21004a Radio receiving unit 21004b Signal demodulation unit
21005 Antenna unit
21006 CSMA/CA unit
22001 Higher layer unit
22002 Transmitting unit
22003 Receiving unit
22004 Antenna unit
22005 CCA-variable channel information processing unit
22006 CSMA/CA unit
31001 Higher layer unit
31002 CCA-variable channel determination unit
31003 Transmitting unit
31003a Notification frame generation unit
31003b Radio transmitting unit
31004 Receiving unit
31004a Radio receiving unit
31004b Signal demodulation unit
31005 Antenna unit
31006 CSMA/CA unit
32001 Higher layer unit
32002 Transmitting unit
32003 Receiving unit
32004 Antenna unit
32005 CCA-variable channel information processing unit
32006 CSMA/CA unit
220021 Physical layer frame generation unit
220022 Radio transmitting unit
220031 Radio receiving unit
220032 Signal demodulation unit
320021 Physical layer frame generation unit
320022 Radio transmitting unit
320031 Radio receiving unit
320032 Signal demodulation unit

The invention claimed is:

1. A base station apparatus for performing communication with a terminal apparatus, comprising:
a signal detector that performs carrier sense to assess the received signal power to confirm a status of use of a channel using either one of a first threshold and a second threshold; and
a transmitting unit that transmits data to the terminal apparatus by using carrier aggregation, using a plurality of channels,
wherein the signal detector performs carrier sense using the first threshold in a case where a communication apparatus other than the terminal apparatus that is configured to belong to the base station apparatus is present in the channel trying to perform the carrier sense, and performs the carrier sense using the second threshold in a case where the communication apparatus other than the terminal apparatus that is configured to belong to the base station apparatus is not present therein,
the transmitting unit transmits the data after the signal detector has performed a first carrier sense according to a duration that is associated with a contention window in at least one of the plurality of channels, and
the second threshold is larger in value than the first threshold.

2. The base station apparatus according to claim 1, wherein the second threshold is configured based on a frequency resource of the channel.

3. The base station apparatus according to claim 1, wherein the signal detector performs a second carrier sense according to the duration that is not associated with the contention window in at least one of channels that have not performed the first carrier sense among the plurality of channels.

4. The base station apparatus according to claim 1, wherein the duration for which the first carrier sense is performed is longer than the duration for which the second carrier sense is performed.

5. The base station apparatus according to claim 1, wherein the duration for which the first carrier sense is performed is set according to priority that is associated with a transmission frame.

6. The base station apparatus according to claim 1, wherein the transmitting unit transmits, to the terminal apparatus, information regarding a band in which the carrier sense is performed.

7. The base station apparatus according to claim 1, wherein the transmitting unit performs communication with the terminal apparatus in compliance with a predetermined standard, and the communication apparatus other than the terminal apparatus that is possible to perform communication with the base station apparatus has a different standard from the predetermined standard.

8. A communication method for use in a base station apparatus for performing communication with a terminal apparatus, the method comprising:
a first step of performing carrier sense to assess the received signal power to confirm a status of use of a channel using either one of a first threshold and a second threshold; and
a second step of transmitting data to the terminal apparatus by using carrier aggregation, using a plurality of channels,
wherein the first step performs carrier sense using the first threshold in a case where a communication apparatus other than the terminal apparatus that is configured to belong to the base station apparatus is present in the channel trying to perform the carrier sense, and performs the carrier sense using the second threshold in a case where the communication apparatus other than the terminal apparatus that is configured to belong to the base station apparatus is not present therein,
the second step transmits the data after the first step has performed a first carrier sense according to a duration that is associated with a contention window in at least one of the plurality of channels, and
the second threshold is larger in value than the first threshold.

* * * * *